(12) United States Patent
Accame et al.

(10) Patent No.: US 12,321,763 B2
(45) Date of Patent: ***Jun. 3, 2025

(54) ADAPTING CLIENT APPLICATION OF FEATURE PHONE BASED ON EXPERIMENT PARAMETERS

(71) Applicant: GOOGLE LLC, Mountain View, CA (US)

(72) Inventors: Diego Accame, San Francisco, CA (US); Abraham Lee, Belmont, CA (US); Yujie Wan, Mountain View, CA (US); Shriya Raghunathan, Redwood City, CA (US); Raymond Carino, San Francisco, CA (US); Feng Ji, Burlingame, CA (US); Shashwat Lal Das, San Francisco, CA (US); Nickolas Westman, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/543,936

(22) Filed: Dec. 18, 2023

(65) Prior Publication Data

US 2024/0118910 A1 Apr. 11, 2024

Related U.S. Application Data

(63) Continuation of application No. 17/552,921, filed on Dec. 16, 2021, now Pat. No. 11,966,764, which is a
(Continued)

(51) Int. Cl.
*G06F 9/00* (2018.01)
*G06F 9/445* (2018.01)
(Continued)

(52) U.S. Cl.
CPC .......... *G06F 9/453* (2018.02); *G06F 9/44557* (2013.01); *G06F 9/455* (2013.01);
(Continued)

(58) Field of Classification Search
CPC ......... G10L 15/22; G10L 15/26; G10L 15/30; G10L 2015/228; H04M 3/4938;
(Continued)

(56) References Cited

U.S. PATENT DOCUMENTS 11,216,292 B2 * 1/2022 Accame .................. G10L 15/22
2003/0215074 A1 11/2003 Wrobel
(Continued)

FOREIGN PATENT DOCUMENTS

| CN | 104486093 | 4/2015 |
|---|---|---|
| CN | 105247511 | 1/2016 |

(Continued)

OTHER PUBLICATIONS

European Patent Office; Communication pursuant to Article 94(3) issued in Application No. 19768939.1, 8 pages, dated May 12, 2022.
(Continued)

*Primary Examiner* — Vu B Hang
(74) *Attorney, Agent, or Firm* — Gray Ice Higdon

(57) ABSTRACT

Some implementations are directed to adapting a client application on a feature phone based on experiment parameters. Some of those implementations are directed to adapting an assistant client application, where the assistant client application interacts with remote assistant component(s) to provide automated assistant functionalities via the assistant client application of the feature phone. Some implementations are additionally or alternatively directed to determining whether an invocation, of an assistant client application on a feature phone, is a request for transcription of voice data received in conjunction with the invocation, or is instead a
(Continued)

request for an assistant response that is responsive to the transcription of the voice data (e.g., includes assistant content that is based on and in addition to the transcription, and that optionally lacks the transcription itself).

20 Claims, 13 Drawing Sheets

Related U.S. Application Data continuation of application No. 16/606,050, filed as application No. PCT/US2019/048324 on Aug. 27, 2019, now Pat. No. 11,216,292.

(60) Provisional application No. 62/723,442, filed on Aug. 27, 2018.

(51) Int. Cl.
  *G06F 9/451* (2018.01)
  *G06F 9/455* (2018.01)
  *G10L 15/22* (2006.01)
  *G10L 15/30* (2013.01)

(52) U.S. Cl.
  CPC ........ *G10L 15/22* (2013.01); *G10L 2015/228* (2013.01); *G10L 15/30* (2013.01)

(58) Field of Classification Search
  CPC .......................... H04M 2201/40; G06F 9/453; G06F 9/44557; G06F 9/455; G06Q 30/0281; G09B 5/06; G09B 7/07
  See application file for complete search history.

(56) References Cited

U.S. PATENT DOCUMENTS

| | | | |
|---|---|---|---|
| 2008/0114583 | A1 | 5/2008 | Al-Onaizan |
| 2008/0270111 | A1 | 10/2008 | Hanumanthappa |
| 2013/0122473 | A1 | 5/2013 | Alghamdi |
| 2013/0347088 | A1 | 12/2013 | McBrearty |
| 2014/0257807 | A1 | 9/2014 | Mauro et al. |
| 2016/0358596 | A1 | 12/2016 | Singh et al. |
| 2022/0107824 | A1 | 4/2022 | Accame et al. |

FOREIGN PATENT DOCUMENTS

| | | |
|---|---|---|
| CN | 105808200 | 7/2016 |
| CN | 106406921 | 2/2017 |
| CN | 106909448 | 6/2017 |
| CN | 107430852 | 12/2017 |
| CN | 107480161 | 12/2017 |
| CN | 107895577 | 4/2018 |
| CN | 108090109 | 5/2018 |
| CN | 108270843 | 7/2018 |
| CN | 108369596 | 8/2018 |
| WO | 2020046920 | 3/2020 |

OTHER PUBLICATIONS

Unknown; "Firebase Remote Config," XP055918680, Retrieved from: Https://web.archive.org/web/20180823033234//https://firebase.google.com/docs/remote-config/, 3 pages, dated Aug. 23, 2018.
Silverman Micah, "Identify, Claims, & Tokens—An OpenID Connect Primer, Part 1 or 3," XP055772720, Retrieved from: https://developer.okta.com/blog/2017/07/25/oidc-primer-part-1, 14 pages, dated Jul. 25, 2017.
Anonymous; "How to store json-patch operations in redis queue and guarantee their consistency;" Stackoverflow; retrieved from internet: URL:https://stackoverflow.com/questions/25831739/how-to-store-json-patch-operations-in-redis-queue-and-guarantee-their-consistenc [retrieved Nov. 27, 2019], Question from "Erick" asked Sep. 14, 2014, at 9:07; 5 pages; Mar. 19, 2017.
European Patent Office; International Search Report and Written Opinion of Ser. No. PCT/US2019/048324, 20 pages; dated Dec. 13, 2019.
Intellectual Property India; Hearing Notice issued in Application No. 202027053828; 2 pages; dated Dec. 13, 2023.
China National Intellectual Property Administration; Notification of First Office Action issued in Application No. 201980043199.7; 15 pages; dated Dec. 18, 2023.
Yao, L. et al., "Design and Implementation of a Case-based Reasoning Human-machine Conversation System" Journal of Computer Applications, vol. 27, No. 3; 4 pages; dated Mar. 10, 2007.
Gu, Y. "Implementation of Smart Voice Assistant System based on Intelligent Voice Interaction Technology"; China Master's Theses Full-text Database (Information Science and Technology); 58 pages; dated May 15, 2016.
European Patent Office; Communication pursuant to Article 94(3) issued in Application No. 19768939.1, 7 pages, dated Mar. 27, 2024.
China National Intellectual Property Administration; Notification of Grant issued in Application No. 201980043199.7; 3 pages; dated May 10, 2024.

* cited by examiner

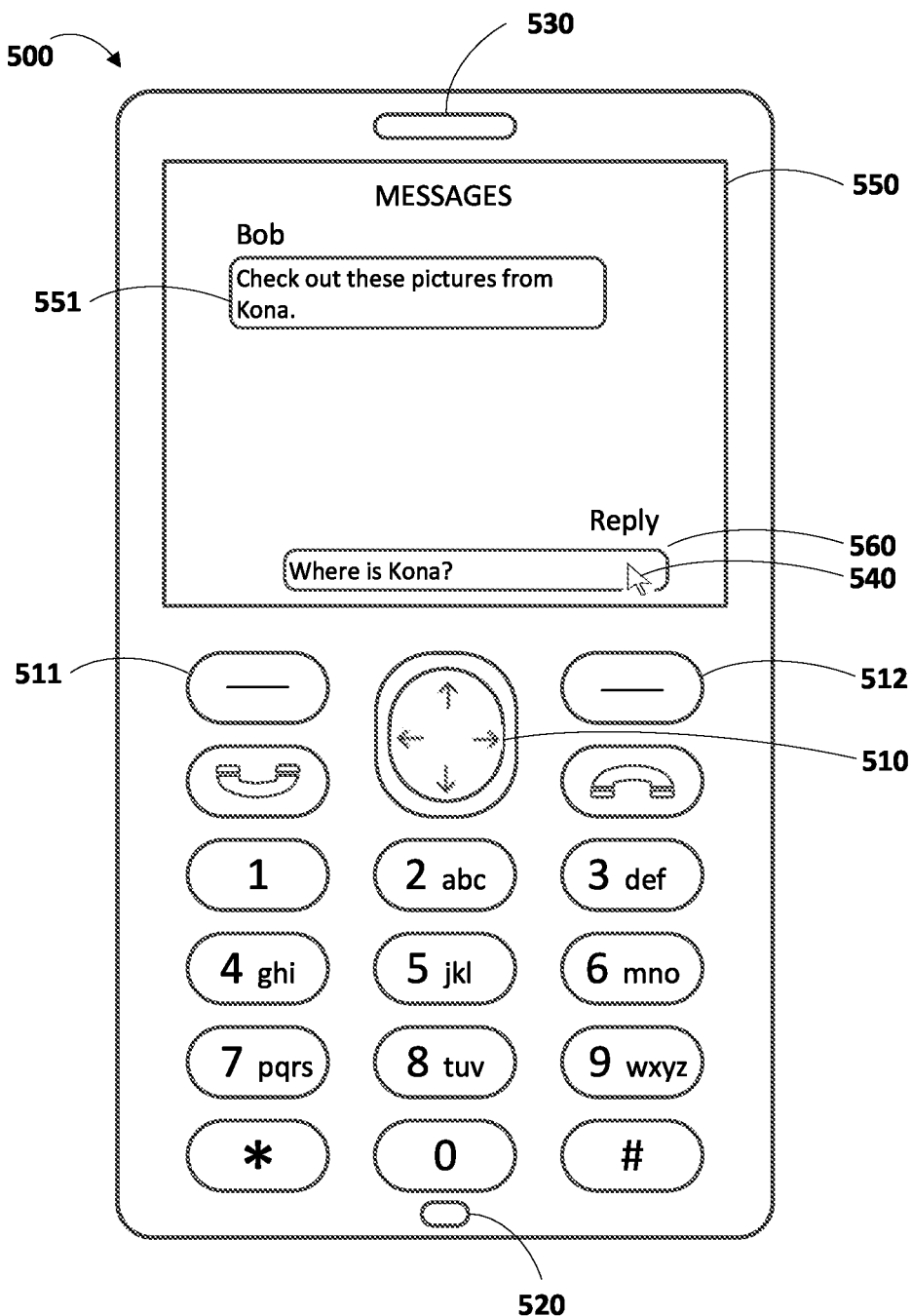
FIG. 5C1

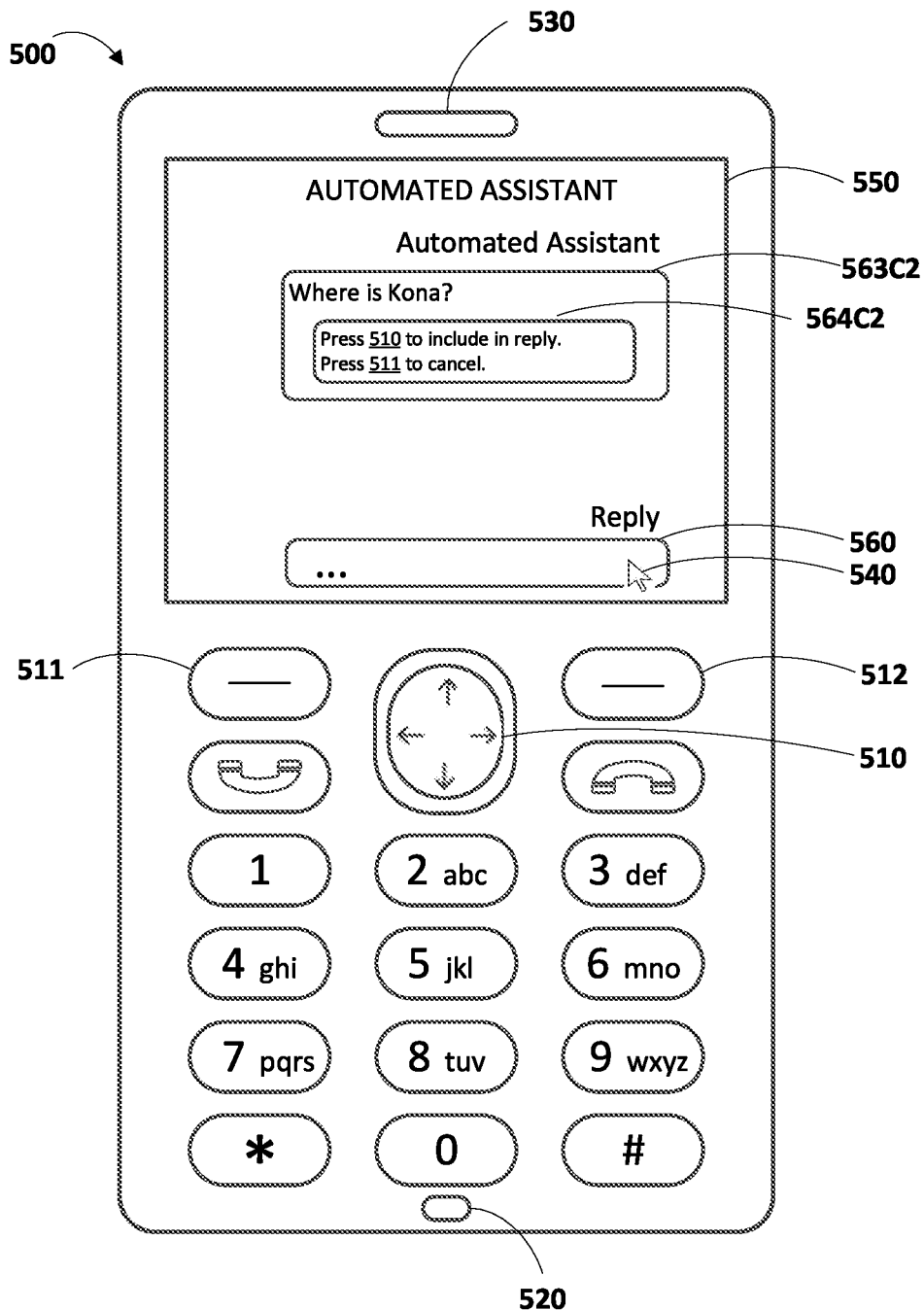
FIG. 5C2

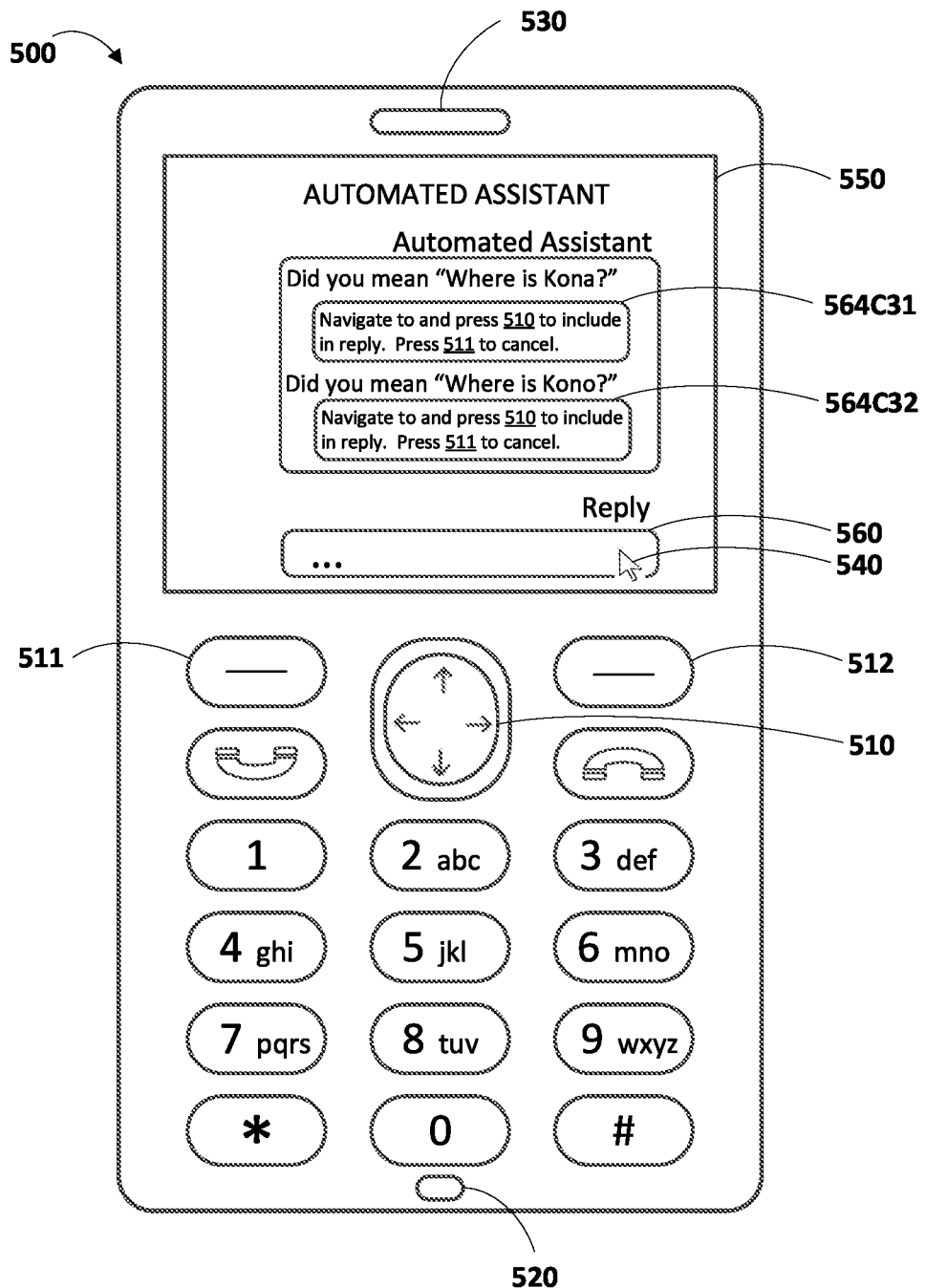
FIG. 5C3

ADAPTING CLIENT APPLICATION OF FEATURE PHONE BASED ON EXPERIMENT PARAMETERS

BACKGROUND

The term "feature phone" is a retronym used to describe a class of handheld computers that lack the full range of capabilities of modern smartphones. A feature phone often lacks a touchscreen, opting instead for a non-touch display (e.g., backlit LCD screen) and a physical keyboard and/or physical navigation button(s). Feature phones can further include low-quality microphone(s), low-quality camera(s), hardware for Wi-Fi connectivity, hardware for broadband cellular network connectivity (e.g., 3G, 4G, and/or 5G), and/or global positioning system (GPS) components.

Mobile operating systems have been developed for feature phones that enable applications to be downloaded and installed (and/or preloaded). The applications can be, for example, HTML 5 based applications that can be used with JavaScript. One non-limiting example of such an operating system is the Linux-based mobile operating system KaiOS, developed by Kai OS Technologies Inc. Many feature phones, via HTML 5 based applications, enable users to experience functionality that is similar to that experienced on modern smartphone, but with less hardware resource usage (e.g., less memory usage, less processor usage, etc.).

Although HTML 5 based applications executed by a feature phone operating system can offer reduced hardware usage (compared to their modern smartphone counterparts), feature phone operating systems and/or limited hardware resources of feature phones also present technical challenges for effectively implementing various applications. One example of such an application is referred to herein as an "assistant client application" (and also sometimes referred to as an "automated assistant client application", an "interactive personal assistant application," an "intelligent personal assistant application," a "personal voice assistant application," etc.).

SUMMARY

Some implementations disclosed herein are directed to adapting a client application on a feature phone based on experiment parameters. Some of those implementations are directed to adapting an assistant client application, where the assistant client application interacts with remote assistant components) to provide automated assistant functionalities via the assistant client application of the feature phone. In adapting a client application based on experiment parameters, a new version of the client application is not installed on the feature phone. Rather, one or more parameters are committed for the client application on the feature phone, where the committed parameter(s) include client side parameters that are used by the client application when the client application is executing, and that adapt behavior of the client application itself—and/or include server side parameters in the form of server token(s) that are transmitted by the client application to remote component(s) associated with the client application—and cause the remote component(s) to generate responsive content that is tailored to experiment(s) mapped to the server token(s), and transmit the generated responsive content to the client application for rendering.

In various implementations, the application on the feature phone is configured to interface with a remote configuration server to fetch experiment parameters (if any) for the application. The application can interface with the remote configuration server when the application is executing in the foreground of the operating system of the feature phone. For example, the application can interface with the remote configuration server as part of the opening procedure of the application and/or while the application is open, but idle. The interfacing with the remote configuration server can optionally occur in response to one or more criteria, such as passage of a threshold amount of time since a most recent interface with the remote configuration server, occurrence of a threshold quantity of openings of the application since a most recent interface with the remote configuration server, and/or other criterion/criteria. Such criteria can limit a quantity of interactions with the remote configuration server by various feature phones, thereby conserving bandwidth that would otherwise be consumed by a greater quantity of interactions and/or conserving resources at the remote configuration server that would otherwise be consumed by handling a greater quantity of interactions.

In interfacing with the remote configuration server, the application fetches new experiment parameter(s) for the application, if any. In various implementations, the application can provide, to the remote configuration server, an indication of currently committed experiment parameters for the application (e.g., via transmission of a currently committed server token as described herein) and the remote configuration server can determine whether to provide new experiment parameter(s) for the application (and/or which of multiple available experiment parameters to provide), based at least in part on the indication of the currently committed experiment parameters.

When new experiment parameters are fetched by the application, the new experiment parameters can be written to local storage (e.g., a transactional database) of the feature phone, without immediately implementing the fetched experiment parameters as committed parameters. In other words, the new experiment parameters can be stored and queued for implementing as committed parameters, without immediately implementing them as committed parameters. Rather, the application can monitor for an occurrence of a committing condition, and commit the queued new experiment parameters as committed parameters only in response to the occurrence of the committing condition. By waiting for the occurrence of the committing condition before committing the new experiment parameters, the application will not be immediately adapted in view of the new experiment parameters.

Waiting for the occurrence of the committing condition (instead of immediately committing the new experiment parameters and adapting the application) can achieve various benefits. For example, immediately committing the new experiment parameters can present drawbacks such as latency (e.g., the application can temporarily "freeze") during a session between a user and the application, can cause one or more functionalities to be altered during the session—causing an error and/or confusion to the user (which can result in the session being prolonged), etc. On the other hand, the committing condition can be selected so that the preceding and/or other drawbacks are mitigated.

For example, the committing condition can be a close condition of the application. The close condition can be responsive to a user request (via user interface input) to close the application and/or an operating system request to close the application. When the committing condition is the close condition, the new experiment parameters can be assigned as committed parameters before closing of the application (e.g., before memory allocated to the application is de-allocated by the operating system). Any latency in assigning the new experiment parameter as committed parameters will not affect interactions between the user and the assistant application, as such interactions will cease regardless as a result of the close condition. Moreover, the committed parameters will not be utilized by the application until the application is again opened, thereby preventing any mid-session altering of functionality of the application.

As another example, the committing condition can be an open condition. The open condition can be responsive to a user request (via user interface input) to open the application and/or an operating system request to open the application. When the committing condition is the open condition, the new experiment parameters can be assigned as committed parameters as part of opening of the application, and can be implemented by the application with that opening—or the previously committed parameters used with that opening, and the committed new experiment parameters implemented by the application with the next opening of the application. With this approach, any latency in assigning the new experiment parameters as committed parameters will not affect ongoing interactions between the user and the assistant application, as such interactions will not occur until the application is opened. Moreover, the committed new experiment parameters will be utilized when the application is opened, or when the application until the application is again opened, thereby preventing any mid-session altering of functionality of the application.

In various implementations, committing the new experiment parameters includes writing the new experiment parameters to a certain database location for committed parameters (e.g., transferring them from a temporary location in ROM of the feature phone to a location that is assigned to committed parameters) and/or changing a temporary "flag" or other temporary indication for the new experiment parameters, to a committed "flag" or other committed indication.

When the new experiment parameters are committed as committed parameters, the application, when opened, will read the committed parameters to an in-memory cache of the operating system, to be used by the application while the application is opened. In various implementations, the committed parameters include one or more server tokens to be included in requests, by the application, to remote component(s) associated with the application. For example, the server token can be included in a header of the request or serialized as part of the request. The remote component(s) generate responsive content in response to the requests, and can generate the responsive content further based on the server token(s). In various implementations, the responsive content is progressive web app content, and is transmitted to the application that generated the request for rendering, by the application, in response to the request.

The server token(s) can include a server side experiment identifier that the remote component(s) can map to one or more experiments to trigger on the server in generating the responsive content. For example, the server side experiments can include experiments that dictate what type of responsive content should be generated (e.g., should the response include: text, audible output, text and audible output, text and an image, a transcription of audio data included in the request or a response that is based on the transcription, etc.), thereby dictating the responsive content that is generated by the remote component(s) and transmitted to the application for rendering in response to the request. The server token(s) can further optionally further include one or more client side experiment identifiers identify one or more client side experiments that are implemented by the client application as a result of the committed new experiment parameters (e.g., client flag value(s) described below). This can enable feedback received responsive to providing the responsive content (e.g., explicit feedback of the user or feedback inferred from user reaction to the responsive content) to be mapped to a combination of the server side experiments and the client side experiments. Through experimentation, among multiple feature phones, for various server side and client side experimentation pairs, feedback can be utilized to determine server side and client side experimentation pairs that result in improved performance (according to one or more evaluation metrics) for the application. Such improved performance experimentation pairs can then be implemented for the application fora large quantity of feature phones, and/or incorporated in a future version of the application—thereby leading to improved performance of the application on many feature phones. It is noted that transmission of the server side tokens enables server-side experimentation to be performed and tracked, without any requirement that an account identifier or other "signed-in" information be known for the application. In other words, the server-side experimentation can enable server-side experimentation, and adaptation based on feedback, even when a corresponding application is being utilized in a "signed-out" mode (e.g., no account identifier or other "signed-in" information is provided with any requests).

In various implementations, the committed parameters additionally or alternatively include one or more client flag values that alter one or more aspects of the client application. In other words, while the server tokens cause content returned from the remote component(s) to be tailored to respective experiment(s), the client flag value(s) alter one or more aspects of the client application itself. In some implementations, one or more of the client flag value(s) can alter how received content returned from the remote component(s) is rendered. For example, the client flag value(s) can dictate a background color for the received content, a color for rendering text in the received content, a font for text in the received content, a size for text in the received content, etc. in some implementations, one or more of the client flag value(s)) can additionally or alternatively alter formats of requests transmitted to remote component(s) and/or what content is included in the request(s). In some implementations, one or more of the client flag value(s)) can additionally or alternatively alter other aspects of the client application, such as how often (and/or under what conditions) it interfaces with the configuration server in checking for updated experiment configurations, how often (and/or under what conditions) it provides certain data to remote component(s) (e.g., contact data provided to remote component(s) for use in biasing certain speech-to-text processing toward contacts included in the contact data), etc.

The above and/or other implementations of the technology described herein can enable experimental testing of applications in view of various constraints of feature phones and/or operating systems of feature phones. As one non-limiting example, feature phone operating systems often enable a limited quantity (e.g., one) of applications to be executing in the foreground of the operating system at any given time, thereby preventing any applications from running in the background of the operating system (or only enabling a very limited number of applications to run in the background). Implementations described above can enable adapting of client applications of the feature phone, to enable experimentation, without requiring the adaptation to be performed while the applications are running in the background, and using technique(s) that mitigate user perceived latency of the application and/or that interrupt (and resultantly prolong) a user session with the application.

Some implementations disclosed herein are additionally or alternatively directed to determining whether an invocation, of an assistant client application on a feature phone, is a request for transcription of voice data received in conjunction with the invocation, or is instead a request for an assistant response that is responsive to the transcription of the voice data (e.g., includes assistant content that is based on and in addition to the transcription, and that optionally lacks the transcription itself). In some of those implementations, the assistant client application can be invoked (i.e., caused to be opened) in response to certain user interface input received at the feature phone, such as a long-press of a certain hardware button (e.g., a press of the hardware button that is longer than 1 second, 2 seconds, 3 seconds, or other threshold). In some versions of those implementations, a user of the feature phone provides spoken input along with the certain user Interface input (e.g., during and/or after the long-press), and the client application transmits a request, to remote assistant component(s), that includes audio data that captures the spoken input and that is detected via microphone(s) of the assistant application. The request further includes an indication of whether a text entry field, of another application that was executing at the feature phone when the invoking user interface input was received, was active. For example, the text entry field can be considered to be active if a cursor, or other indicator of a currently active portion of a display, was focused on the text entry field. The cursor (or other indicator) can optionally be rendered by the other application and can be controlled by the user via navigational hardware button(s) of the feature phone.

In various implementations, when the request include an indication that the text entry field of the other application was active, the remote assistant component(s) perform speech-to-text processing of the audio data to generate one or more transcriptions of the spoken utterance, and transmit at least one of the transcriptions (e.g., that determined to be most probable according to the speech-to-text processing) in response to the request. The at least one of the transcriptions can then be automatically incorporated into the text entry field of the other application (e.g., by the assistant client application by interfacing with an API or other communication protocol of the other application)—or can be presented as a selectable option to the user and, if affirmatively selected (e.g., via a hardware button of the feature phone), incorporated into the text entry field of the other application.

In various implementations, when the request included an indication that the text entry field of the other application was not active (or that no other application was active), the remote assistant component(s) perform speech-to-text processing of the audio data to generate one or more transcriptions of the spoken utterance, then determine an assistant response that is responsive to the transcription, but that includes information that is in addition to the transcription (and that optionally lacks the transcription). For example, the remote assistant component(s) can perform natural language understanding (NLU) of the transcription to determine an intent and parameters for the intent, generate a structured request based on the intent and parameters, generate responsive assistant content based on the structured request, and transmit the assistant responsive content for rendering by the assistant application.

In these and other manners, the assistant application can be invoked in response to the same user interface input, but the responsiveness of the assistant application to spoken input can be based at least in part on whether a text entry filed was active when the assistant application was invoked. For example, assume a messaging application executing on a feature phone and displaying a received message of "want to go to the lake tomorrow", and displaying a "reply" text entry field. In a first scenario, if the reply entry field is active and the user invokes the assistant and speaks "what's the weather for tomorrow", remote assistant component(s) can process corresponding audio data to generate a transcription of "what's the weather for tomorrow", and the transcription can be automatically incorporated in the reply entry field (or even automatically transmitted as a reply) or presented for selectable incorporation in the reply entry field. In a second scenario, if the reply entry field is not active and the user invokes the assistant and speaks "what's the weather for tomorrow", remote assistant component(s) can: process corresponding audio data to generate a transcription of "what's the weather for tomorrow"; determine, based on the transcription, an intent of "weather forecast" and parameters of "tomorrow" and "current location of the user"; receive a weather forecast for "tomorrow" in response to a structured request that includes the intent and parameters; and transmit the weather forecast for rending via the assistant application. As noted above, the different treatments of the same audio data in the two scenarios can be contingent on the corresponding requests including differing indications of whether the text entry field was active. In these and other manners, user interface inputs at the feature phone can be simplified, as the same hardware element input can be utilized to invoke the assistant application in both scenarios, and the same brief spoken input can be utilized in both scenarios to achieve differing results dependent on whether the text entry field is active (and without the user needing to speak lengthier phrases that require more bandwidth to transmit and/or more processing power to process—such as "transcribe the following_____" or "give me an assistant response for the following_____").

Implementations related to experimentation parameters can be implemented in combination with implementations that determine whether to transcribe spoken input, or generate an assistant response based on spoken input—including implementations that make such a determination based on whether text entry fields are active and/or based on other considerations (e.g., a screenshot of the other application, context of the other application, general context (e.g., time of day, day of the week, location of the feature phone, etc.). For example, server tokens can be configured that dictate whether remote automated assistant component(s) return only the best transcription, or return multiple transcriptions in at least some situations. For example, a server token can be mapped to an experiment where the two best transcriptions are returned when the best transcription is associated with less than a first level of confidence, and the second best transcription is associated with greater than a second level of confidence (e.g., the first transcription isn't very confident, and the second best is nearly as confident). Also, for example, a client side flag value can be mapped to an experiment where the client device includes, in a request, an indication of context of the other application and/or a general context, and the server side token can be mapped to an experiment where the indication of context of the other application and the general context are taken into account in determining whether a request is a transcription request or a request for assistant content. As yet another example, a client side flag value can dictate whether a returned transcription is automatically incorporated in an active text entry field, or is instead first presented as a selectable element that, when selected, is then incorporated in the active text entry field.

The above description is provided as an overview of various implementations described herein. Those, and other implementations, are described in more detail below.

In some implementations, a method performed by an assistant client application executed by one or more processors of a feature phone is provided, and the method includes, while the assistant client application is executing in the foreground of an operating system of the feature phone: interfacing with a remote configuration server to fetch experiment parameters for the assistant client application. The fetched experiment parameters can include: one or more client flag values that, when committed, alter one or more aspects of the assistant client application, and one or more server tokens that, when committed, are incorporated in requests, by the assistant client application to a remote assistant server, to cause the remote assistant server to generate responses that are tailored to the one or more server tokens. The method further includes writing the fetched experiment parameters to local storage of the feature phone. Writing the fetched experiment parameters to the local storage queues the fetched experiment parameters for implementing as committed parameters in response to occurrence of a committing condition of the assistant client application, without immediately implementing the fetched experiment parameters as the committed parameters. The method further includes detecting an occurrence of the committing condition and, in response to detecting the occurrence of the committing condition: committing the fetched experiment parameters as committed parameters of the assistant client application. The method further includes, subsequent to committing the fetched experiment parameters as committed parameters and when the assistant client application is closed: receiving a request to open the assistant client application and, in response to receiving the request, opening the assistant client application. Opening the assistant client application includes reading the one or more client flag values and the one or more server tokens of the committed parameters to in-memory cache for the assistant client application. Reading the one or more client flag values to the in-memory cache causes the one or more aspects of the assistant client application to be altered, and reading the one or more server tokens to the in-memory cache causes the one or more server tokens to be included in a request, by the assistant client application, to the remote assistant server.

These and other implementations of technology disclosed herein may optionally include one or more of the following features.

In some implementations, the feature phone includes a display, but lacks any touchscreen.

In some implementations, the committing condition is a close condition. The close condition can be responsive to a user request, or an operating system request, to close the assistant client application. In some of those implementations, committing the fetched experiment parameters as the committed parameters includes blocking the assistant client application, after receiving the user request or the operating system request but before closing of the assistant client application, until the fetched experiment parameters are committed as the committed parameters. In some versions of those implementations, the method further includes detecting that the fetched experiment parameters are committed as the committed parameters, and closing the assistant client application responsive to the close condition, and after detecting that the fetched experiment parameters are committed. Closing the assistant client application can include causing the operating system to de-allocate all memory allocated to the assistant client application.

In some implementations, the committing condition is an open condition. The open condition can be responsive to a prior request to open the assistant client application, where the prior request precedes the request to open the assistant client application, and follows writing the fetched experiment parameters to the local storage.

In some implementations, interfacing with the remote configuration server to fetch the experiment parameters for the assistant client application is responsive to determining that at least a threshold amount of time has passed since the assistant client application of the feature phone last interfaced with the remote configuration server to fetch experiment parameters.

In some implementations, the method further includes: receiving, after opening the assistant client application, voice data detected via at least one microphone of the client device; transmitting, to the remote assistant server, a request that includes the voice data and the one or more server tokens of the committed parameters; and receiving, from the remote assistant server, content to be rendered in response to the request, where the content is tailored to the one or more server tokens of the committed parameters. In some of those implementations, the method further includes rendering the content based on at least one of the client flag values of the committed parameters. For example, the content can include includes text and rendering the content based on at least one of the client flag values of the committed parameters can include: rendering the text in a color dictated by the at least one of the client flag values, rendering the text in a font dictated by the at least one of the client flag values, and/or rendering the text with a size dictated by the at least one of the client flag values. In some implementations, the one or more server tokens influence whether the content is: a transcription of the voice data to be incorporated in a text entry field that was active when the voice data was detected, or an assistant response that is responsive to the transcription of the voice data, but that lacks the transcription of the voice data. In some implementations, the one or more server tokens influence whether the content includes: a single best transcription of the voice data, or the single best transcription of the voice data, and one or more additional candidate transcriptions of the voice data. In some implementations the content includes at least a first transcription of the voice data and a second transcription of the voice data, and at least one of the local flags dictates whether the first transcription and the second transcription are displayed simultaneously, or are displayed sequentially.

In some implementations, the content is an assistant response that is provided as a progressive web app.

In some implementations, the one or more local flags include at least one local flag that alters when a next interfacing with the remote configuration server will occur to check for new experiment parameters for the assistant client application.

In some implementations, the one or more local flags include at least one local flag that alters when one or more contacts, stored locally on the feature phone, will be transmitted to the remote assistant server for use by the remote assistant server in biasing certain speech-to-text processing toward the one or more contacts.

In some implementations, a method performed by a client application executed by one or more processors of a feature phone is provided and includes: receiving a request to open the client application and, in response to receiving the request, opening the client application. Opening the client application includes reading currently committed parameters to in-memory cache for the client application, where the one or more currently committed parameters include: client flag values that cause one or more aspects of the client application to be altered; and one or more server tokens that are included in requests, by the client application, to a remote server, and that cause the remote server to generate responses to the request that are based on the one or more server tokens. The method further includes determining, when the client application is executing in the foreground of the operating system responsive to the opening, to interface with a remote configuration server to fetch experiment parameters for the client application. The method further includes interfacing with the remote configuration server to fetch updated experiment parameters for the client application. The method further includes writing the fetched updated experiment parameters to local storage of the feature phone. Writing the updated fetched experiment parameters to the local storage queues the updated fetched updated experiment parameters for committing in replacement of the currently committed parameters in response to occurrence of a committing condition of the client application, without immediately committing the updated fetched experiment parameters in replacement of the currently committed parameters. The method further includes detecting an occurrence of the committing condition and, in response to detecting the occurrence of the committing condition: committing the fetched updated experiment parameters, including replacing one or more of the currently committed parameters with the fetched updated experiment parameters.

These and other implementations of the technology can include one or more of the following features.

In some implementations, the committing condition is a close condition. In some of those implementations, the method further includes: receiving a new request to open the client application, the new request being the first request to open the client application that follows committing the fetched updated experiment parameters; and in response to receiving the new request, opening the client application, were opening the client application includes reading the one or more fetched updated experiment parameters to in-memory cache for the client application.

In some implementations, the client application is an assistant client application.

In some implementations, the one or more fetched updated experiment parameters comprise an opaque server token that is incorporated in requests, from the client application to a remote server. The opaque server token includes a server side experiment identifier that is mapped, at the remote server, to one or more experiments to trigger on the remote server in response to identification of the server side experiment identifier in the opaque server token. In some of those implementations, the opaque server token is considered opaque in that it does not directly identify the experiments to be triggered but, rather, can only be mapped to the experiments with data available at the remote server (thereby preventing direct mapping to the experiments based only on data contained at the feature phone).

In addition, some implementations include one or more processors of one or more computing devices (e.g., processor(s) of a feature phone), where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 5A, FIG. 5B, FIG. 5C1, FIG. 5C2, and FIG. 5C3 illustrate various examples of a user interacting with an assistant client application of a feature phone to obtain transcription(s) of spoken input, for incorporating in a text entry field of another client application.

FIG. 1A, FIG. 6B, and FIG. 6C illustrate an example of a user interacting with an assistant client application of a feature phone to obtain responsive assistant content in response to spoken input.

DETAILED DESCRIPTION

Figure 1:
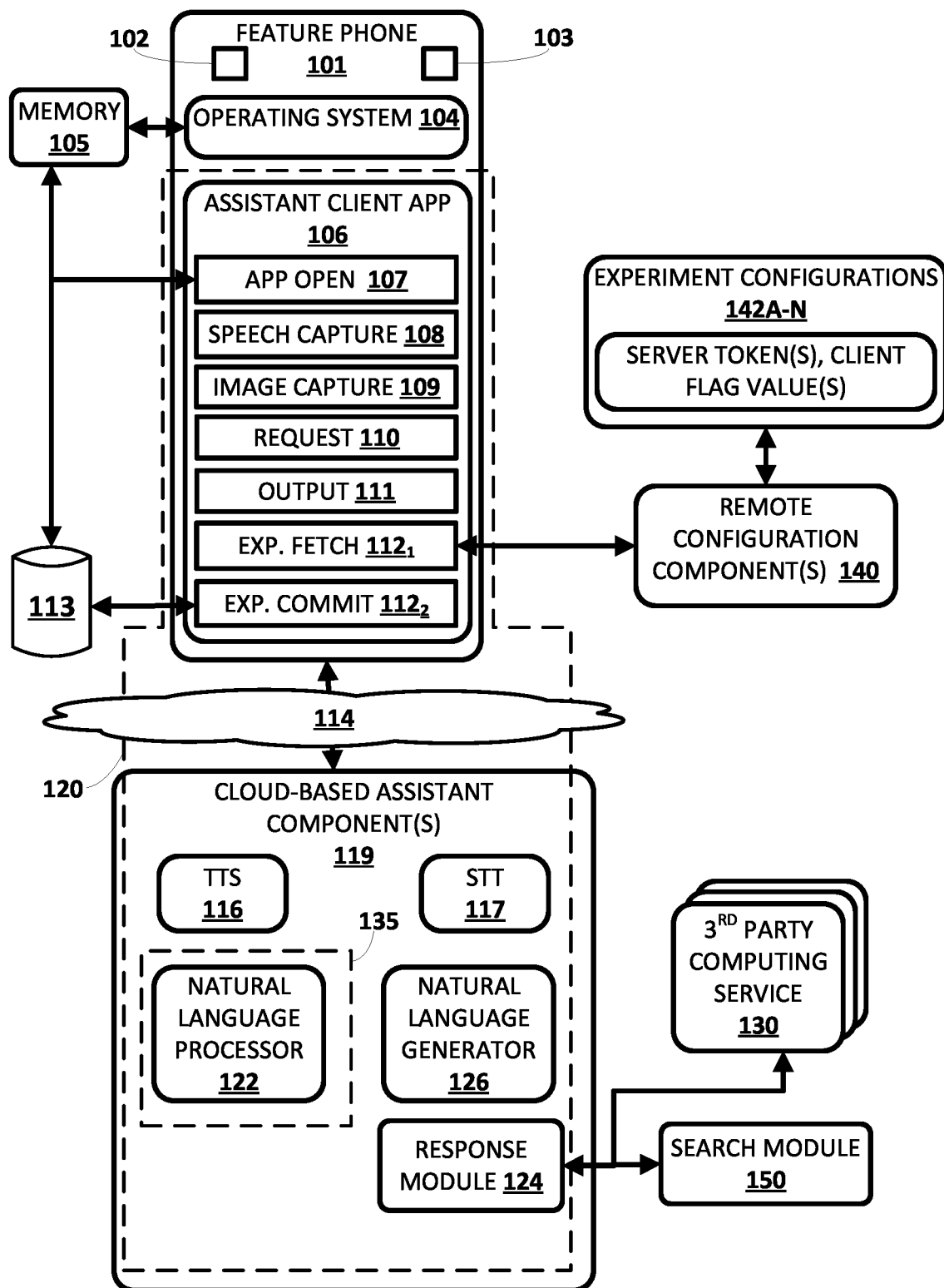
FIG. 1 is a block diagram of an example environment in which implementations disclosed herein may be implemented.

Now turning to FIG. 1, an example environment in which techniques disclosed herein may be implemented is illustrated. The example environment includes one or feature phones 101. Each feature phone 101 selectively executes a respective instance of an automated assistant client application 106 (also referred to herein as "assistant client application 106" or "assistant client app 106"). One or more cloud-based automated assistant components 119, which may also be referred to herein collectively as a "remote assistant server" of an automated assistant, may be implemented on one or more computing systems that are communicatively coupled to feature phones 101 via one or more local and/or wide area networks (e.g., the Internet) indicated generally at 114. Although the singular term "server" is used herein in referencing "remote assistant server", it is understood that in many implementations the "remote assistant server" is a collection of servers and/or other computing systems, such as one or more clusters of high-performance servers implemented using a cloud infrastructure.

In various implementations, an instance of assistant client application 106, by way of its interactions with one or more cloud-based automated assistant components 119, may form what appears to be, from the user's perspective, a logical instance of an automated assistant 120 with which the user may engage in a human-to-computer dialog, obtain voice transcriptions, etc. One instance of such an automated assistant 120 is depicted in FIG. 1 in dashed line. It thus should be understood that each user that engages with an assistant client application 106 executing on a respective feature phone 101 may, in effect, engage with his or her own logical instance of an automated assistant 120. For the sakes of brevity and simplicity, the term "automated assistant" as used herein as "serving" a particular user will refer to the combination of an assistant client application 106 executing on a feature phone 101 operated by the user and one or more cloud-based automated assistant components 119 (which may be shared amongst multiple assistant client application 106).

The one or more feature phones 101 may include various computing devices that are similar to smartphones, but lack the full range of capabilities of modern smartphones. In various implementations, one or more of the feature phones 101 can lack a touchscreen, and instead include a non-touch display (e.g., backlit LCD screen) and a physical keyboard and/or physical navigation button(s). In various implementations, one or more of the feature phones 101 can additionally or alternatively include a mobile operating system 104 designed specifically for feature phones. Some such operating systems can restrict applications installed thereon from running in the background, or can severely limit the quantity of applications that can run in the background (e.g., allowing only one application to run in the background, or only allowing application(s) to run in the background if severely restricted memory usage limits are satisfied). Moreover, some such operating systems can additionally or alternatively require applications to utilize certain markup languages, such as HTML 5 that can be used with JavaScript.

In some implementations, feature phone 101 may be equipped with one or more vision sensors 102 having one or more fields of view, although this is not required. Vision sensor(s) 102 may take various forms, such as a low-quality digital camera. The one or more vision sensors 102 may be used, e.g., by an image capture module 109, to capture image frame(s) (still image(s) or video) of an environment in which feature phone 101 is deployed. These image frames may then be transmitted to cloud-based assistant component(s) 119, as part of a request, assistant content generated by the cloud-based assistant component(s) 119 based on the image frame(s), and the assistant content returned to the assistant client application 106 for rendering. For example, an image that captures a leaf can be transmitted to the cloud-based assistant component(s) 119, and assistant content returned that identifies the plant from which the leaf originated, along with additional detail(s) on the plant. The request can optionally include server token(s) of a committed configuration as described herein, and the assistant content tailored to experiment(s) that are mapped to the server token(s). Additionally, or alternatively, the assistant content can be rendered by the assistant client application 106 in a manner dictated by client flag value(s) of a committed configuration, and/or the request generated in a manner dictated by client flag value(s) of the committed configuration.

Additionally, in many implementations feature phone 101 is equipped with one or more microphones 103. The microphone(s) 103 can detect audio data, such as audio data that captures spoken utterances of a user of the feature phone 101, ambient sound(s), etc. As described herein, the detected audio data (optionally compressed) can be included along with a request, by assistant client application 106, to cloud-based assistant component(s) 119. For example, the detected audio data can be provided as streaming audio data to the cloud-based assistant component(s) 119 via a streaming channel established between the assistant client application 106 and the cloud-based assistant component(s) 119 in combination with a request. As also described herein, the cloud-based assistant component(s) 119 can, in some situations, transcribe the audio data by performing speech-to-text processing (e.g., via speech-to-text component 117 described below), and provide the transcribed text to assistant client application 106 for incorporation, by assistant client application 106, in a text entry field of another application that was active when the assistant client application 106 was invoked.

As also described herein, the cloud-based assistant component(s) 119 can, in some other situations, transcribe the audio data by performing speech-to-text processing, generate an assistant request based on the transcription, obtain responsive assistant content based on the assistant request, and provide the responsive assistant content to assistant client application 106 for rendering by the assistant client application 106. The request associated with audio data transmitted to the cloud-based assistant components) 119 can optionally include server token(s) of a committed configuration as described herein, and the transcription(s) or assistant content that are returned in response to the request can be tailored to experiment(s) that are mapped to the server token(s). Additionally, or alternatively, the assistant content or transcription can be rendered by the assistant client application 106 in a manner dictated by client flag value(s) of a committed configuration, and/or the request generated in a manner dictated by client flag value(s).

Each of client computing device 106 and computing device(s) operating cloud-based automated assistant components 119 may include one or more memories for storage of data and software applications, one or more processors for accessing data and executing applications, and other components that facilitate communication over a network. The operations performed by cloud-based automated assistant component(s) 119 may be distributed across multiple computer systems. Cloud-based automated assistant component(s) 119 may be implemented as, for example, computer programs running on one or more computers in one or more locations that are coupled to each other through a network.

As noted above, in various implementations, feature phone 101 may operate an automated assistant client application 106, or "client portion" of automated assistant 120. In various implementations, automated assistant client application 106 may include an app open/invocation module 107, a speech capture module 108, the image capture module 109, a request module 110, an output module 111, an experiment fetching module $112_1$, and an experiment committing module $112_2$ The app open/invocation module 107 can cause the assistant client application 106 to be invoked (e.g., opened and executed in the foreground of the operating system 104) in response to certain user interface input received at the feature phone 106, such as a long-press of a certain hardware button (e.g., a press of a multi-purpose hardware button that is longer than 1 second, 2 seconds, 3 seconds, or other threshold). As described herein, the operating system 104 may prevent assistant client application 106 from running in the background ever, or in certain conditions) and when the app open module 107 opens the assistant application 107, it opens the assistant application 107 from a fully closed state. When the app open module 107 opens the application it can read currently committed parameters, from committed parameters data structure 113, to an in-memory cache in memory 105 of operating system 104. The app open module 107 can write the currently committed parameters directly to the in-memory cache, or interface with the operating system 104 in writing the currently committed parameters. The committed parameters data structure 113 can be part of local storage available at the feature phone 101 and stores the currently committed parameters to be used by the assistant client application 106. As described in more detail herein, the currently committed parameters stored in committed parameters data structure 113 can include experimental configuration parameters that are stored in response to being fetched by experiment fetching module $112_1$ and in response to experiment committing module $112_2$ committing those experimental configuration parameters in response to the occurrence of a committing condition.

Speech capture module 108, which may be implemented using any combination of hardware and software, may interface with hardware such as microphone(s) 103 or other pressure sensor to capture audio data corresponding to a user's utterance(s) and/or other audible sounds captured via microphone(s) 103. Further, speech capture module 108 can provide the audio data (e.g., a stream of the audio data and/or a recording of the audio data) to cloud-based assistant component(s) 119 along with a request, for further processing (e.g., for providing a transcription of the audio data, or an assistant response that is responsive to the audio data).

The image capture module 109, which may be implemented using any combination of hardware or software, may be configured to interface with vision sensor(s) 102 to capture one or more image frames (e.g., digital photographs) that correspond to a field of view of the vision sensor 102. Further, image capture module 109 can provide the image frame(s) to cloud-based assistant component(s) 119 along with a request, for further processing (e.g., for providing an assistant response).

Request module 110, which may be implemented using any combination of hardware and software, generates and transmits requests to cloud-based assistant components) 119. The requests can include audio data captured by speech capture module 108, image data captured by image capture module 109, and/or other data such as context data, data that indicates whether a text entry field of another application was active when the assistant client application 106 was invoked, etc. Further, the requests can include server token(s) for a currently committed experiment configuration. For example, the request module 110 can obtain the server token(s) from in-memory cache of memory 105 and can include the server token(s) in a header of a request, or in serialized form as part of the request. As described herein, the server tokens cause the cloud-based assistant component(s) 119 to generate a response, to the request, where the response is tailored to the server token(s). For example, the cloud-based assistant component(s) 119 can unpack the server token(s) from the request, determine server-side experiment(s) that are mapped to the server token(s), and generate the response using the determined server-side experiment(s).

Output module 111, which may be implemented using any combination of hardware and software, receives responsive content from the cloud-based assistant component(s) 119 (where the responsive content is responsive to a request transmitted by request module 110). The output module 111 further outputs the responsive content. In some implementations, the responsive content is assistant content, and the output module 111 causes the assistant content to be rendered via the assistant client application. The assistant content can include text, images, and/or other content to be visually rendered via a display of the feature phone 101, audio data (e.g., a text-to-speech version of text) to be rendered via speaker(s) of the feature phone, and/or other content to be rendered via a display, speaker(s), and/or other user interface output device(s). In some other implementations, the responsive content is a transcription to be incorporated in a text entry field of another application. In some of those other implementations, the output module 111 can interface with the other application and cause the transcription to be automatically incorporated in the text entry field of the other application, and the other application to be executed and/or brought to the foreground with the incorporated transcription. In some of those other implementations, the output module 111 can first cause the transcription to be rendered (visually and/or audibly) via the assistant client application 106 and only cause the transcription to be incorporated in the text entry field of the other application if affirmative user interface input is received responsive to the rendering. In yet other implementations, the responsive content can be assistant content that is not necessarily rendered by the assistant application. For example, in response to a request that includes voice data corresponding to the spoken utterance "call Geraldine", responsive assistant content can be provided that causes the output module 111 to interface with a phone dialing application of the feature phone 101 to cause the phone dialing application to dial a contact with the name Geraldine. Also, for example, in response to a request that includes voice data corresponding to the spoken utterance "turn on the living room lights", responsive assistant content can be provided to a third-party system that controls the "living room lights" to cause the lights to "turn on", and responsive assistant content can be provided that causes the output module 111 to confirm that the lights were turned on (e.g., audible content of "OK, living room lights are turned on").

The experiment fetching module $112_1$, which may be implemented using any combination of hardware and software, interfaces with a remote configuration component(s) 140 (also referred to herein as "remote configuration server"—which can include one or more server(s)) to fetch updated experiment parameters (if any) for the assistant client application 106. The experiment fetching module $112_1$ can interface with the remote configuration component(s) 140 when the assistant client application 106 is executing in the foreground of the operating system 104 of the feature phone 101. For example, the experiment fetching module $112_1$ can interface with the remote configuration component(s) 140 as part of the opening procedure of the application and/or while the application is open, but idle. The interfacing with the remote configuration components) 140 can optionally occur in response to one or more criteria, such as passage of a threshold amount of time since a most recent interface with the remote configuration server, occurrence of a threshold quantity of openings of the assistant client application 106 since a most recent interface with the remote configuration component(s) 140, and/or other criterion/criteria. Such criteria can limit a quantity of interactions with the remote configuration server by various feature phones, thereby conserving bandwidth that would otherwise be consumed by a greater quantity of interactions and/or conserving resources at the remote configuration component(s) 140 that would otherwise be consumed by handling a greater quantity of interactions.

In interfacing with the remote configuration component(s) 140, the experiment fetching module $112_1$ fetches new experiment parameter(s) for the application, if any. In various implementations, the experiment fetching module $112_1$ can provide, to the remote configuration component(s) 140, an indication of currently committed experiment parameters for the assistant client application (e.g., via transmission of a currently committed server token loaded in in-memory cache) and the remote configuration components) 140 can determine whether to provide new experiment parameter(s) for the assistant client application 106 (and/or which of multiple available experiment parameters to provide), based at least in part on the indication of the currently committed experiment parameters. It is noted that, in various implementations, the remote configuration component(s) 140 seek to provide differing experiment configurations to differing feature phones and/or seek to provide experiment configuration(s) to only a certain percentage and/or quantity of feature phones. In these and other manners, the remote configuration component(s) can select and limit when experiment configurations are provided, and those components and/or other components can perform analysis on various experimental configuration parameters before rolling those out to additional assistant client applications on additional phones, or incorporating them as part of a new version of an assistant client application. For example, the remote configuration component(s) 140 can select the experiment configurations, to provide to experiment fetching module $112_1$, from a plurality of available experiment configurations 142A-N. Each of the available experiment configurations 142A-N can be a unique pair of server token(s) and client flag value(s).

When new experiment parameters are fetched by the experiment fetching module $112_1$, the new experiment parameters can be written to local storage (e.g., a transactional database) of the feature phone 101, without immediately implementing the fetched experiment parameters as committed parameters. In other words, the new experiment parameters can be stored and queued for implementing as committed parameters, without immediately implementing them as committed parameters. Rather, the experiment committing module $112_2$ can monitor for an occurrence of a committing condition, and commit the queued new experiment parameters as committed parameters only in response to the occurrence of the committing condition. In some implementations, committing the queued new experiment parameters as committed parameters includes storing them in committed parameters data structure 113 (thereby replacing any conflicting parameters) and/or otherwise flagging the new experiment parameters as committed. By waiting for the occurrence of the committing condition before committing the new experiment parameters, the assistant client application 106 will not be immediately adapted in view of the new experiment parameters.

In some implementations, the committing condition can be a close condition of the assistant client application 106. The close condition can be responsive to a user request (via user interface input) to close the application and/or an operating system request to close the application. When the committing condition is the close condition, the experiment committing module $112_2$ can assign new experiment parameters as committed parameters before closing of the assistant client application 106 (e.g., before memory allocated to the application is de-allocated by the operating system). In some other implementations, the committing condition can be an open condition. The open condition can be responsive to a user request (via user interface input) to open the application and/or an operating system request to open the application. When the committing condition is the open condition, the experiment committing module $112_2$ can assign the new experiment parameters as committed parameters as part of opening of the assistant client application 106, and can be implemented by the app open module 107 with that opening (e.g., by reading the committed parameters to in-memory cache) or the previously committed parameters used by the app open module 107 with that opening, and the committed new experiment parameters implemented by the by the app open module 107 with the next opening of the assistant client application 106.

When new experiment parameters are committed, by experiment committing module $112_2$, as committed parameters, the app open module 107, when opening assistant client application 106, will read the committed parameters to an in-memory cache of the memory 105, to be used by the assistant client application 106 while the application is opened. In various implementations, the committed parameters include one or more server tokens to be included in requests, by the request module 110, to the cloud-based assistant component(s) 119. The cloud-based assistant component(s) 119 generate responsive content in response to the requests, and can generate the responsive content further based on the server token(s). In various implementations, the responsive content is progressive web app content, and is transmitted to the assistant client application 106 for rendering, by the output module 111, in response to the request.

The server token(s) can include a server side experiment identifier that cloud-based assistant component(s) 119 can map to one or more experiments to trigger in generating the responsive content. For example, the server side experiments can include experiments that dictate what type of responsive content should be generated, which third party computing service(s) 130 (described below) should be interacted with (if any) in generating the responsive content, how many search results from search module 150 should be provided as responsive content, etc. The server token(s) can further optionally further include one or more client side experiment identifiers identify one or more client side experiments that are implemented by the assistant client application 106 as a result of the committed experiment parameters (e.g., client flag value(s)). This can enable feedback received responsive to providing the responsive content (e.g., explicit feedback of the user or feedback inferred from user reaction to the responsive content) to be mapped to a combination of the server side experiments and the client side experiments. Through experimentation, among multiple feature phones, for various server side and client side experimentation pairs, feedback can be utilized to determine server side and client side experimentation pairs that result in improved performance (according to one or more evaluation metrics) for the application. Such improved performance experimentation pairs can then be implemented for the application for a large quantity of feature phones, and/or incorporated in a future version of the application—thereby leading to improved performance of the application on many feature phones. It is noted that transmission of the server side tokens enables server-side experimentation to be performed and tracked, without any requirement that an account identifier or other "signed-in" information be known for the application. In other words, the server-side experimentation can enable server-side experimentation, and adaptation based on feedback, even when a corresponding application is being utilized in a "signed-out" mode (e.g., no account identifier or other "signed-in" information is provided with any requests).

In various implementations, the committed parameters additionally or alternatively include one or more client flag values that alter one or more aspects of the assistant client application 106. In other words, while the server tokens cause content returned from the remote component(s) to be tailored to respective experiment(s), the client flag value(s) alter one or more aspects of the assistant client application 106 itself. In some implementations, one or more of the client flag value(s) can alter how output module 111 renders received content returned from the cloud-based assistant component(s) 119. In some implementations, one or more of the client flag value(s)) can additionally or alternatively alter formats of requests generated by the request module 110 and/or what content is included in the request(s). In some implementations, one or more of the client flag value(s)) can additionally or alternatively alter other aspects of the client application, such as how often experiment fetching module $112_1$ interfaces with the remote configuration component(s) 140 in checking for updated experiment configurations, how often (and/or under what conditions) it provides certain data to remote component(s) (e.g., contact data provided to cloud-based assistant component(s) 119 for use by STT module 117 in biasing certain speech-to-text processing toward contacts included in the contact data), etc.

Cloud-based assistant component(s) 119 include speech-to-text ("STT") module 117, and text-to-speech ("TTS") module 116. STT module 117 can process audio data, received with a request, and convert spoken input included therein into text (thereby creating a transcription of the spoken input). In various implementations, the STT module 117 has access to various STT models, optionally each conforming to a different language and/or dialect, and can select a subset (e.g., one) of those based on data included with the corresponding request by request module 111. For example, request module 111 may include, in a request, a set preferred language for the feature phone 101 and/or multiple candidate language(s) for the feature phone, and those model(s) utilized in performing the STT processing. In some implementations, STT module 117 may convert an audio recording of speech to one or more phonemes, and then convert the one or more phonemes to one or more candidate transcriptions. Additionally or alternatively, in some implementations, STT module 117 may employ a state decoding graph. In some implementations, STT module 117 may generate a plurality of candidate textual interpretations of the user's utterance. Each of the candidate transcriptions can be associated with a corresponding score that indicates confidence the transcription is correct. Such a score can be based on, for example, a degree of matching between the phonemes and the candidate transcriptions. In various implementations, when a request from assistant client application 106 includes an indication that it is a transcription request, the STT module 117 can convert audio data of the request to text, and provide the text to response module 124 for providing in response to the request. In those implementations, processing by natural language processor, TTS module 116, and/or natural language generator can be bypassed.

TTS module 116 may be configured to convert textual data (e.g., natural language responses formulated by automated assistant 120) into computer-generated speech output. In some implementations, TTS module 116 may provide the computer-generated speech output to feature phone 101 to be output directly, e.g., using one or more speakers.

The cloud-based automated assistant component(s) 119 also include an intent matcher 135 that can be configured to determine an intent of a request based on a transcription of audio data provided with the request, context data provided with the request, and/or based on other signals, such as sensor signals, online signals (e.g., data obtained from web services), and so forth. In some implementations, intent matcher 135 may include a natural language processor 122. Natural language processor 122 may be configured to process transcribed audio data, typed natural language input generated by user(s) via feature phone 101, etc.—and may generate annotated output (e.g., in textual form) for use by one or more other components of automated assistant 120. For example, the natural language processor 122 may process natural language free-form input that is generated by a user via one or more user interface input devices of feature phone 101. The generated annotated output includes one or more annotations of the natural language input and one or more (e.g., all) of the terms of the natural language input.

In some implementations, the natural language processor 122 is configured to identify and annotate various types of grammatical information in natural language input. For example, the natural language processor 122 may include a morphological module that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Intent matcher 135 may use various techniques to determine an intent of the user, e.g., based on output from natural language processor 122 (which may include annotations and terms of the natural language input). In some implementations, intent matcher 135 may have access to one or more databases (not depicted) that include, for instance, a plurality of mappings between grammars, and responsive actions (or more generally, intents). In many cases, these grammars may be selected and/or learned over time, and may represent the most common intents of users. For example, one grammar, "play<artist>", may be mapped to an intent that invokes a responsive action that causes music by the <artist> to be played on the feature phone 101 operated by the user. Another grammar, "[weather|forecast] today," may be match-able to user queries such as "what's the weather today" and "what's the forecast for today?"

In some implementations, an experiment mapped to a server token included in a request can dictate intent matching by intent matcher 135. For example, in some implementations, an experiment may dictate that intent matcher 135 should use "looser" intent matching rules. For instance, intent matcher 135 may determine a grammar of "<artist>" is mapped to an inferred intent that causes music by the <artist> to be played on the feature phone 101 operated by the user—even though the term "play" (or similar term) may be missing. Accordingly, per an experiment dictated by a server token, intent matcher 135 can cause a song of an artist to be played at feature phone in response to a spoken utterance that includes only the artist name, or that includes only the song name—and omits "play" or any other "action" term.

In addition to or instead of grammars, in some implementations, intent matcher 135 may employ one or more trained machine learning models, alone or in combination with one or more grammars. These trained machine learning models may also be stored in one or more databases and may be trained to identify intents, e.g., by embedding data indicative of a user's utterance and/or any detected user-provided visual cues into a reduced dimensionality space, and then determining which other embeddings (and therefore, intents) are most proximate, e.g., using techniques such as Euclidean distance, cosine similarity, etc.

As seen in the "play <artist)." example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?").

In some implementations, automated assistant 120 may serve as an intermediary between users and one or more third party computing services 130 (or "third party agents", or "agents"). These third party computing services 130 may be independent software processes that receive input and provide responsive output. Some third party computing services may take the form of third party applications that may or may not operate on computing systems that are separate from those that operate, for instance, cloud-based automated assistant components 119. One kind of user intent that may be identified by intent matcher 135 is to engage a third party computing service 130. For example, automated assistant 120 may provide access to an application programming interface ("API") to a service for controlling a smart device. A user may invoke automated assistant 120 and provide a command such as "I'd like to turn the heating on." Intent matcher 135 may map this command to a grammar that triggers automated assistant 120 to engage with the third party service, thereby to cause the user's heating to be switched on. The third party service 130 may provide automated assistant 120 with a minimum list of slots that need to be filled in order to fulfill (or "resolve") a command to turn the heating on. In this example, the slots may include the temperature to which the heating is to be set, and a duration for which the heating is to be on. Automated assistant 120 may generate and provide to the user (via feature phone 101) natural language output that solicits parameters for the slots. In some implementations, which third party computing service(s) 130 are engaged can be dictated by experiment parameters that correspond to server token(s) included in a corresponding request.

Response module 124 may be configured to receive the predicted/estimated intent that is output by intent matcher 135, as well as an associated slot values (whether provided by the user proactively or solicited from the user) and fulfill (or "resolve") the intent. In various implementations, fulfillment (or "resolution") of the user's intent may cause various fulfillment information (also referred to as "responsive" information or "resolution information") to be generated/obtained, e.g., by response module 124. As will be described below, the fulfillment information may in some implementations be provided to a natural language generator 126, which may generate natural language output based on the fulfillment information.

Fulfillment (or "resolution") information may take various forms because an intent can be fulfilled (or "resolved") in a variety of ways. Suppose a user requests pure information, such as "Where were the outdoor shots of 'The Shining' filmed?" The intent of the user may be determined, e.g., by intent matcher 135, as being a search query. The intent and content of the search query may be provided to response module 124, which as depicted in FIG. 1 may be in communication with one or more search modules 150 configured to search corpuses of documents and/or other data sources (e.g., knowledge graphs, etc.) for responsive information. Response module 124 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oregon." This responsive information may form part of the fulfillment information generated by response module 124.

Additionally or alternatively, response module 124 may be configured to receive, e.g., from intent matcher 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, etc. in some such implementations, fulfillment information may include slot values associated with the fulfillment, confirmation responses (which may be selected from predetermined responses in some cases), etc.

Natural language generator 126 may be configured to generate and/or select natural language output (e.g., words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

Figure 2:
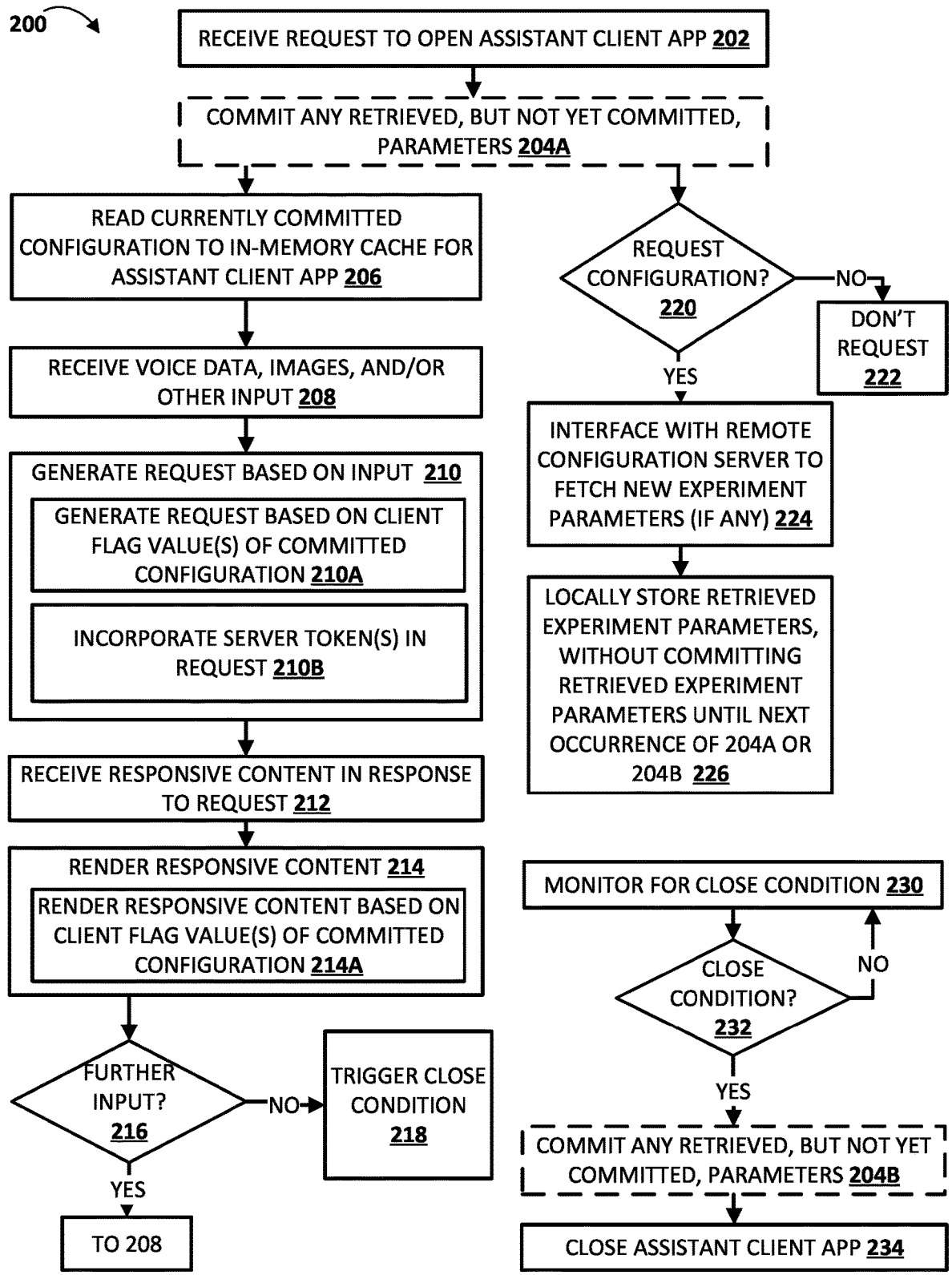
FIG. 2 depicts a flowchart illustrating an example method of implementing experimental configuration parameters, by an application of a feature phone.

FIG. 2 is a flowchart illustrating an example method 200 of implementing experimental configuration parameters, by an application of a feature phone. For convenience, the operations of the flowchart are described with reference to a system that performs the operations. This system may include various components of various computer systems, such as assistant client application 106 of feature phone 101. Moreover, while operations of method 200 are shown in a particular order, this is not meant to be limiting. One or more operations may be reordered, omitted, or added.

At block 202, the system receives a request to open an assistant client application. For example, the request can be certain user interface input received at a feature phone. For instance, the certain user interface input can be a long-press of a hardware button, and an operating system of the feature phone can provide the request to pen the assistant client application, in response to detecting the long-press of the hardware button.

At optional block 204A, the system commits any retrieved, but not yet committed, parameters for the assistant client application. Block 204A is illustrated as optional since, in various implementations of method 200, only one of block 204A or block 204B may be implemented. Moreover, the one of block 204A and block 204B may not be implemented in every iteration of method 200, as described herein. When block 204A is implemented, the system can commit parameters that were retrieved in block 224 in a prior iteration of method 200, but that have not yet been implemented as committed parameters. In various implementations, committing the parameters includes writing the parameters to a certain database location for committed parameters and/or changing a temporary "flag" or other temporary indication for the parameters experiment parameters, to a committed "flag" or other committed indication.

The system proceeds to block 206 and 220. The system can perform blocks 206 and 220 (and/or respective downstream blocks) in parallel and/or sequentially. At block 220, the system determines whether it should request new experiment configuration parameters from a remote configuration server. In some implementations, the system determines to request new experiment configuration parameters based on a threshold amount of time passing since new experiment configuration parameters were requested, and/or based on one or more other criteria. In other implementations, block 220 may be omitted, and new experiment configuration parameters requested in conjunction with each opening of the assistant client application.

If, at block 220, the system determines not to request new experiment configuration parameters, the system proceeds to block 222 and does not request the new experiment configuration parameters. If, at block 220, the system determines to request new experiment configuration parameters, the system proceeds to block 224 and interfaces with the remote configuration server to fetch new experiment parameters (if any). In various implementations, the system can provide, to the remote configuration server, an indication of currently committed experiment parameters for the application (e.g., via transmission of a currently committed server token as described herein) and the remote configuration server can determine whether to provide new experiment parameter(s) for the application (and/or which of multiple available experiment parameters to provide), based at least in part on the indication of the currently committed experiment parameters.

At block 226, the system locally stores the retrieved experiment parameters, without committing the retrieved experiment parameters to memory until the next occurrence of block 204A or block 204B.

At block 206, the system reads a currently committed configuration to an in-memory cached for the assistant client application. In implementations where block 204A is implemented, the currently committed configuration can be that committed in a prior iteration of block 204A (which may be in the current iteration of method 200 if not yet committed parameters were committed at block 204A in the current iteration—or a prior iteration of method 200 if no not yet committed parameters were available at block 204A in the current iteration). In implementations where block 204B is implemented, the currently committed configuration can be that committed in a prior iteration of block 204B (which may be in the immediately preceding iteration of method 200 if not yet committed parameters were committed at block 204B in the immediately preceding iteration—or further preceding iteration of method 200 if no not yet committed parameters were available at block 204B in the immediately preceding iteration).

At block 208, the system receives voice data, images, and/or other input in association with the request to open the assistant client application. For example, the system can receive voice data that is based on a detected spoken utterance received at a microphone after and/or during (e.g., and buffered) opening of the assistant client application.

At block 210, the system generates a request based on the input received in block 208. In generating the request based on the input, the system can optionally perform sub-block 210A and/or sub-block 210B. At sub-block 210A, the system generates the request based on client flag value(s) of the committed configuration. For example, the system can format the request and/or determine non-server token value(s) to include in the request, based at least in part on the client flag value(s) of the committed configuration. At sub-block 210B, the system incorporates server token(s), of the committed configuration, in the request (e.g., in a header, or serially). As described herein, the server token(s) can include a server side experiment identifier that the remote component(s) can map to one or more experiments to trigger on the server in generating responsive content.

At block 212, the system receives content in response to the request generated in block 212. The received content can be, for example, a transcription or assistant content, as described herein. Further, as described herein, the received content is based on the request, and can be tailored based on the experiment(s) indicated by the server token(s) included in the request. For example, the server side experiments can include experiments that dictate what type of responsive content should be generated At block 214, the system renders the received responsive content received at block 212. In some implementations, block 214 includes sub-block 214A, where the system renders the responsive content based on the client flag value(s) of the committed configuration. For example, the client flag value(s) can dictate a background color for the received content, a color for rendering text in the received content, a font for text in the received content, a size for text in the received content, etc.

At block 216, the system determines whether it has received any further input. If the system has received further input, then the system returns to block 208. If the system has not received further input, then a close condition is triggered at block 218.

At block 230, the system monitors for occurrence of a close condition. The close condition can be the result of performance of block 218, or the result of user interface input indicating an explicit desire to close the assistant client application (e.g., actuation of a hardware button that causes a currently executing application to be closed, navigation to and selection of an "X" of other close icon/symbol), or a request from the operating system of the feature phone (e.g., to clear memory for a new app open request). Regardless of the cause of the occurrence condition, if at block 212 a close condition is determined, the system proceeds to optional block 204B and to block 234. If a close condition is not determined the system proceeds back to block 230 and continues to monitor for the close condition.

At block 204B, the system commits any retrieved, but not yet committed, parameters for the assistant client application. Block 204B is illustrated as optional since, in various implementations of method 200, only one of block 204A or block 204B may be implemented (and neither may be implemented in various iterations of method 200). When block 204B is implemented, the system can commit parameters that were retrieved in block 224 of the current iteration of method 200, but that have not yet been implemented as committed parameters. In various implementations, committing the parameters includes writing the parameters to a certain database location for committed parameters and/or changing a temporary "flag" or other temporary indication for the parameters experiment parameters, to a committed "flag" or other committed indication.

At block 234, the system closes the assistant client application. The system can close the assistant client application after detecting that the parameters are committed at block 204B (when block 204B is implemented). Closing the assistant client application can include, for example, causing memory, allocated to the assistant client application, to be de-allocated by the operating system.

Although method 200 of FIG. 2 is described in conjunction with an assistant client application, it is understood that method 200 and/or variations thereof can be performed in conjunction with various alternative applications. For example, other applications executed by the feature phone may likewise generate and transmit requests to associated remote server(s) and receive, in response to the request, responsive content in the form of a progressive web app and/or otherwise. Further, those other application can interface with a remote configuration server and incorporate, in the requests, server tokens that identify current server-side experiments and/or current client-side experiments.

Figure 3:
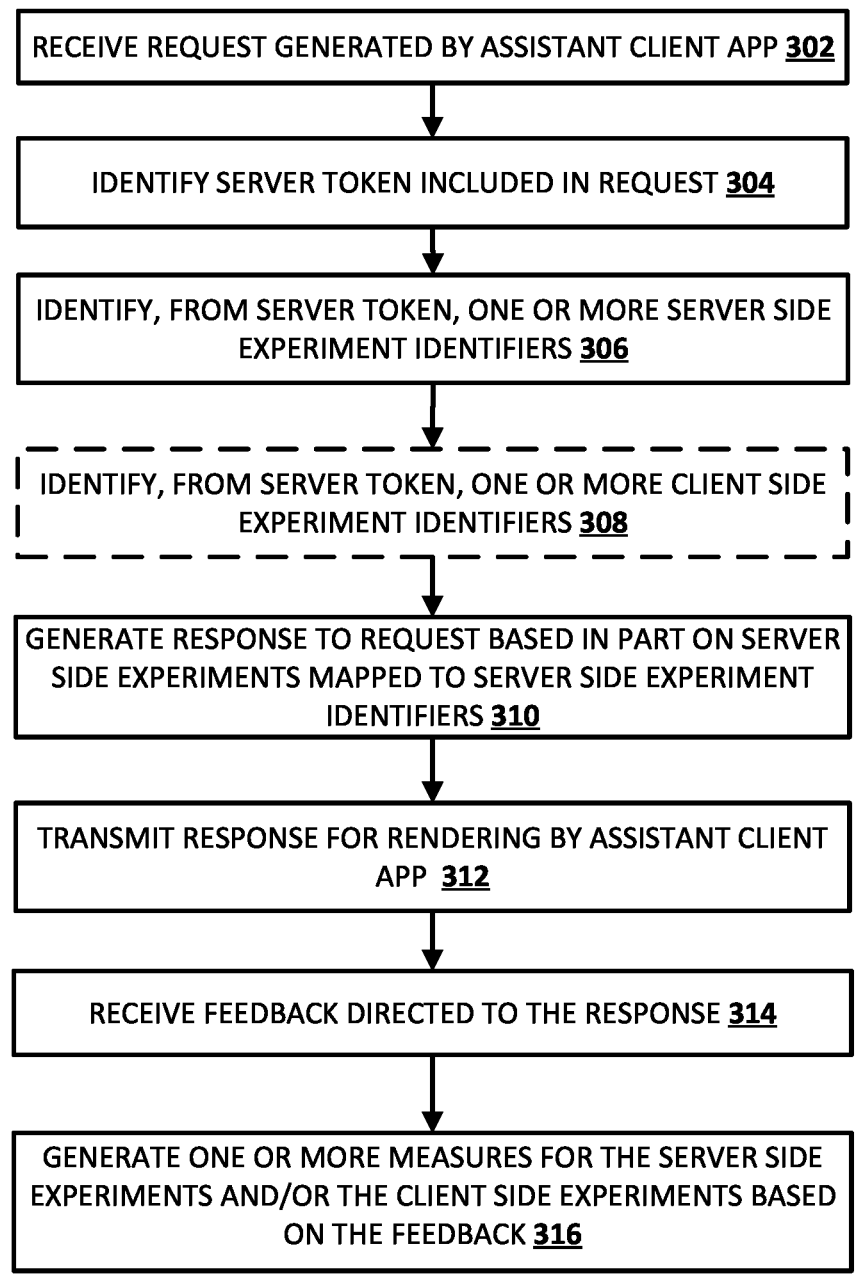
FIG. 3 depicts a flowchart illustrating an example method of generating a response, by a remote server associated with an application, based on experiment parameter(s) included in a server token transmitted by the application.

FIG. 3 is a flowchart illustrating an example method 300 of generating a response, by a remote server associated with an application, based on experiment parameter(s) included in a server token transmitted by the application. For convenience, the operations of the flowchart are described with reference to a system that performs the operations. This system may include various components of various computer systems, such as cloud-based assistant component(s) 119. Moreover, while operations of method 300 are shown in a particular order, this is not meant to be limiting. One or more operations may be reordered, omitted, or added.

At block 302, the system receives a request generated by an assistant client application.

At block 304, the system identifies a server token included in the request received at block 302.

At block 306, the system identifies, frons the server token, one or more server side experiment identifiers.

At optional block 308, the system also identifies, from the server token, one or more client side experiment identifiers.

At block 310, the system generates a response to the received request based in part on one or more server side experiments mapped to the one or more server side experiment identifiers.

At block 312, the system transmits the response for rendering by the assistant client application.

At block 314, the system receives feedback directed to the response. The feedback can include explicit feedback provided by the user, such as feedback provided in response to a prompt provided to the user following rendering of the response (e.g., a prompt of "how did you like this response", with user selectable options such as ("3 m great", "2 T OK", "1 m it was bad"). The feedback can additionally or alternatively include implicit feedback such as feedback that is based on an amount of time the user engaged with the response (e.g., less than 1 second or more than 10 seconds could indicate negative feedback, but between 1 and 10 seconds could indicate positive feedback), if the user continued to engage with the assistant client application following the response (e.g., if the user continued to engage with the assistant client application with similar request, this could be negative feedback), etc.

At block 316, the system generates one or more measures for the server side experiments and/or the client side experiments based on the feedback. For example, the system can generate the measure(s) based on the feedback and based on additional instances of feedback provided based on response(s) provided for rendering at other assistant client apps using the same server side experiments and/or the same client side experiments. For example, the measure(s) can be based on an average or other statistical measure of explicit user feedback. The optional identification of the client side experiment identifiers at block 308 can be used to associate feedback with server side/client side experiment pairs. Such measure(s) can be utilized to determine server side experiments, client side experiments, and/or client side experimentation pairs that result in improved performance (according to the measure(s)) for the application. Such improved performance experiments can then be implemented for the application fora large quantity of feature phones, and/or incorporated in a future version of the application—thereby leading to improved performance of the application on many feature phones. Further, such measure(s) can be utilized to determine server side experiments, client side experiments, and/or client side experimentation pairs degraded performance (according to the measure(s)) for the application. Such degraded performance experiments can then be removed from implementation with the application and/or prevented from incorporation in a future version of the application—thereby leading to improved performance of the application on many feature phones.

Figure 4:
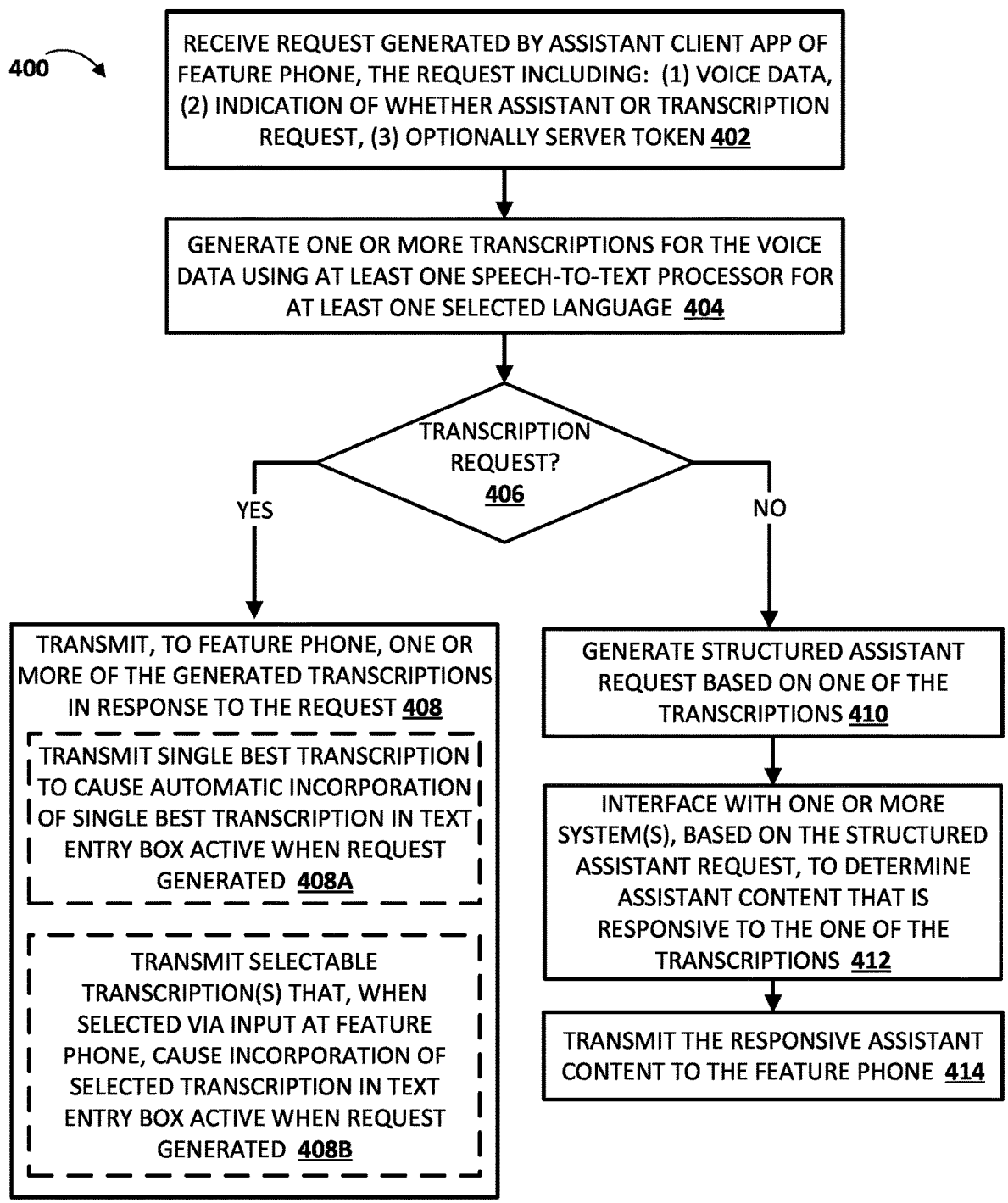
FIG. 4 depicts a flowchart illustrating an example of determining whether to transmit a transcription or responsive content in response to a request, from an assistant client application, that includes voice data.

FIG. 4 is a flowchart illustrating an example method 400 of determining whether to transmit a transcription or responsive content in response to a request, from an assistant client application, that includes voice data. For convenience, the operations of the flowchart are described with reference to a system that performs the operations. This system may include various components of various computer systems, such as cloud-based assistant component(s) 119. Moreover, while operations of method 400 are shown in a particular order, this is not meant to be limiting. One or more operations may be reordered, omitted, or added.

At block 402, the system receives a request generated by an assistant client application of a feature phone. The request generated by the assistant client application can include one or more of: voice data, an indication of whether the request is an assistant request or a transcription request, and an optional server token. As described herein, the indication of whether the request is an assistant request or a transcription request can be based at least in part on whether a text entry field, of another application that was executing at the feature phone when the assistant client application was invoked, was active.

At block 404, the system generates one or more transcriptions for the voice data using at least one speech-to-text processor for at least one selected language.

At block 406, the system determines whether the request is a transcription request. In some implementations, the system determines whether the request is a transcription request based on whether the indication included in the request at block 402 indicates that the request is a transcription request. In some implementations, in determining whether the request is a transcription request, the system additionally or alternatively utilizes analysis (e.g., intent matching) of the transcription, context data, and/or other data that is included with the request. In various implementations, the system determines whether the request is a transcription request utilizing experiment criteria that are mapped to a server token optionally received with the request at block 402. For example, the server token can indicate that the system should utilize analysis (e.g., intent matching) of the transcription in determining whether the request is a transcription request. For instance, the system can determine the request is a transcription request based at least in part on intent matching of the transcription not finding any matching intents for the transcription.

If, at block 406, the system determines that the request is a transcription request, then the system proceeds to block 408. At block 408, the system transmits, to the feature phone, one or more of the generated transcriptions in response to the request received at block 402. In transmitting one or more of the generated transcriptions in response to the request, the system may optionally perform sub-block 408A or sub-block 408B. At sub-block 408A, the system may transmit a single best transcription to cause automatic incorporation of the single best transcription in the text entry field that was active when the request was generated. Alternatively, at sub-block 408B, the system may transmit one or more selectable transcription(s) that, when one of the transcription(s) is selected via input at the feature phone, cause incorporation of the selected transcription in the text entry field that was active when the request was generated. In some implementations, whether the system performs sub-block 408A, sub-block 408B, or an alternative sub-block at block 408, can optionally be based on a server token optionally received with the request at block 402. For example, the server token can indicate an experiment that is mapped to performance of block 408A, and not to performance of block 408B.

If, at block 406, the system determines that there is not a transcription request included in the request received at block 402, then the system proceeds to block 410.

At block 410, the system generates a structured assistant request based on one of the transcriptions. For example, the system can perform natural language understanding (NLU) of the transcription to determine an intent and parameters for the intent, and generate the structured assistant request based on the intent and parameters At block 412, the system interfaces with one or more systems), based on the structured system request, to determine assistant content that is responsive to one of the transcriptions.

At block 414, the system transmits the responsive content to the feature phone. For example, the system can transmit the responsive assistant content for rendering by the assistant application of the feature phone. Also, for example, the system can transmit the responsive assistant content to cause the feature phone to interface with another application. In various implementations, the assistant content generated at block 412 includes content that is in addition to the transcription generated at block 404, and may optionally omit the transcription.

FIGS. 5A, 5B, 5C1, 5C2, and 5C3 illustrate various examples of a user interacting with an assistant client application of a feature phone to obtain transcription(s) of spoken input, for incorporating in a text entry field of another client application.

Figure 5A:
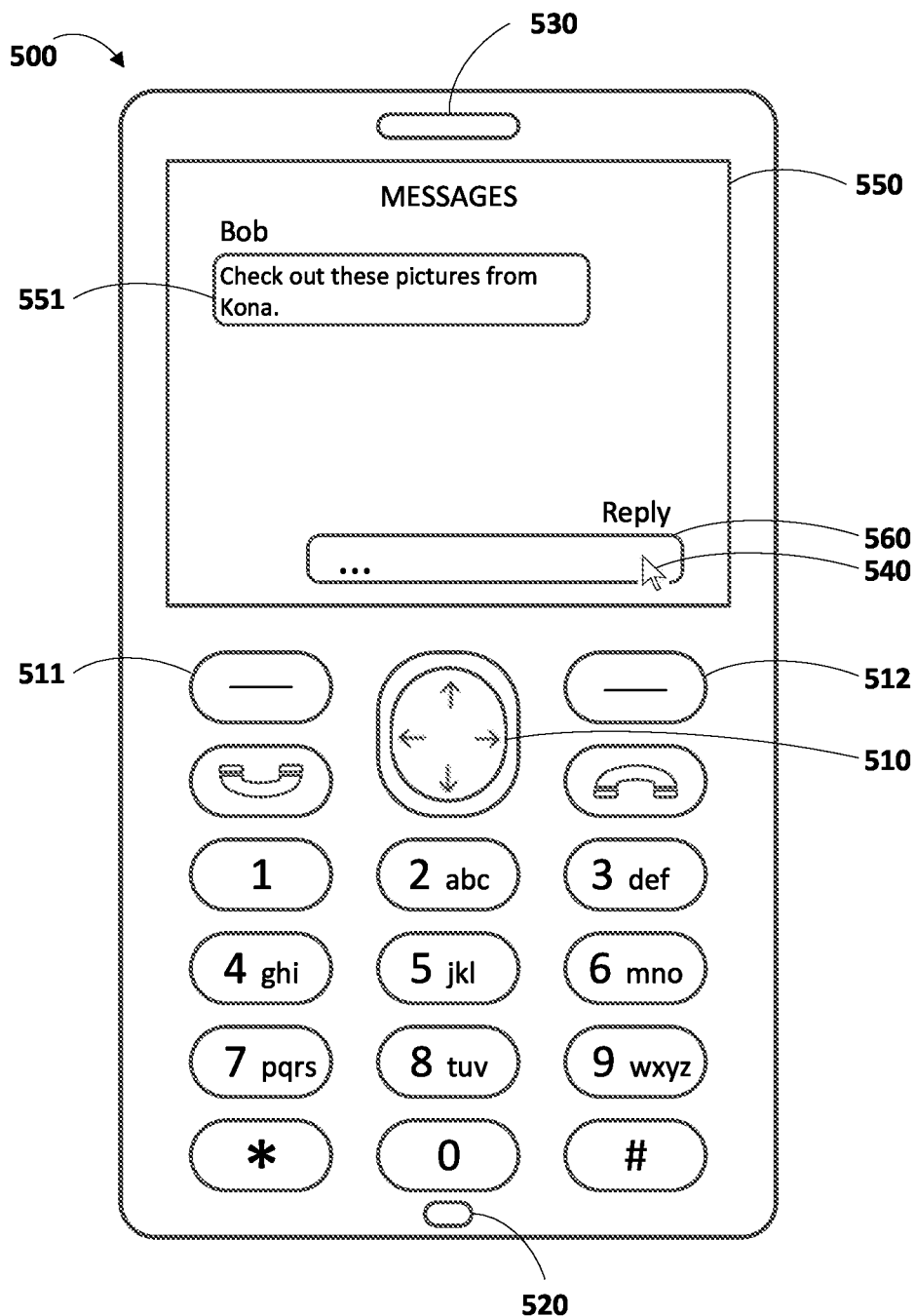
Figure 5B:
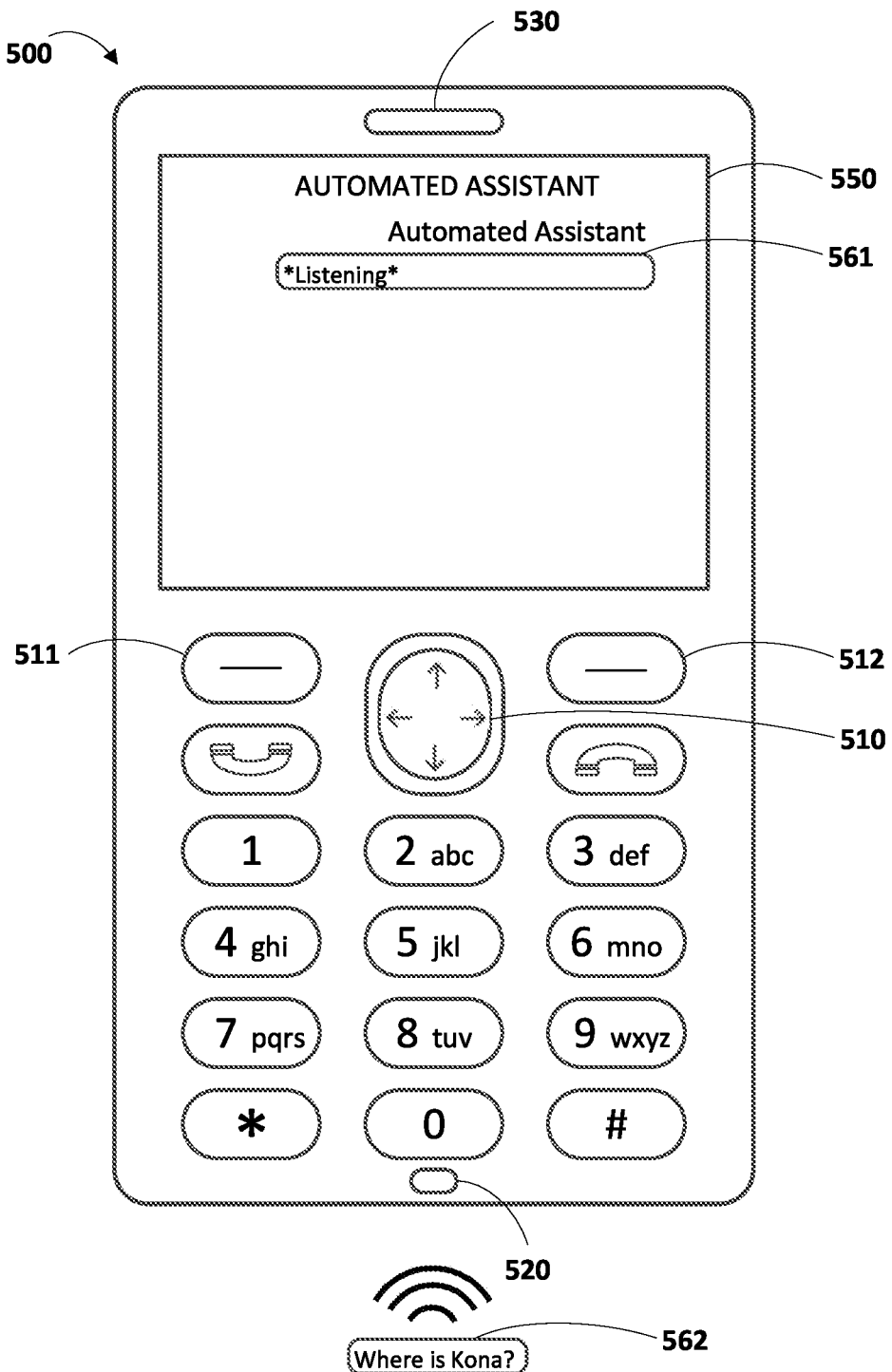

FIG. 5A includes a feature phone 500 having a navigation button 510, a first selectable button 511, a second selectable button 512, a microphone 520, a speaker 530, a cursor 540, a feature phone display 550, and a text entry field 560 that is active. The text entry field is considered active as the cursor 540 is positioned in the text entry field 560. The cursor 540 can be positioned in the text entry field responsive to the user using arrows of navigation button 510 to position the cursor, or can be automatically positioned in the text entry field (e.g., by the "MESSAGES" application). Although a cursor 540 is illustrated, alternative symbols or other indications can be provided to indicate which area(s) of the display 550 are active. The feature phone display 550 illustrates a "MESSAGES" application where a user has received an initial message 551 from Bob. The initial message 551 from Bob states "Check out these pictures from Kona."

FIG. 56 includes the feature phone 500 after an assistant client application has been invoked when the "MESSAGES" application was in the state depicted in FIG. 5A. For example, the assistant client application can be invoked in response to a user long-pressing the center of the navigation button 510 or another button (e.g., 511 or 512). The feature phone display 550 illustrates the assistant client application. In response to the assistant client application being invoked, the assistant client application may provide an indication 561 of "Listening*" to indicate that the automated assistant application is ready to receive spoken input from the user. In response to the indication 561, a user may provide spoken input 562 that is detected by a microphone 520 of the feature phone 500 and provided as voice data to the assistant client application. In this example, the spoken input 562 is "Where is Kona?"

At least based in part on the text entry field (540 of FIG. 5A) of the "MESSAGES" application being active when the assistant client application was invoked, the spoken input 562 can be determined, by the assistant application, to be a request for transcription (as opposed to a request for assistant content) of the spoken input. FIGS. 5C1, 5C2, and 5C3 illustrate some alternative examples of how the transcription of the spoken input can be rendered to the user and/or incorporated in the text entry field 540 of FIG. 5A. In particular, FIGS. 5C1, 5C2, and 5C3 show examples of interfaces that can follow the user providing of spoken input 562 in FIG. 56.

In FIG. 5C1, the feature phone display 550 illustrates the "MESSAGES" application with the transcription "where is Kona" automatically incorporated in the text entry field 540. For example, the assistant application can interface with the "MESSAGES" application to cause the transcription to be automatically incorporated and, optionally, to cause the "MESSAGES" application to be automatically executed again in the state shown in FIG. 5C1 (when the "MESSAGES" application was closed responsive to invoking of the assistant client application).

In FIG. 5C2, the feature phone display 550 illustrates the "AUTOMATED ASSISTANT" application, along with the transcription "where is Kona", along with instructions indicating that the user can select navigation button 510 (e.g., a center click) to include the transcription in the text entry field 560 of the "MESSAGES" application or select button 511 to cancel (e.g., go back to the "MESSAGES" application without incorporation of the transcription into the text entry field 560). If navigation button 510 is selected, the assistant client application can interface with the "MESSAGES" application (e.g., as described with respect to FIG. 5C) to cause the transcription to be incorporated in the text entry field 560.

FIG. 5C3 is similar to FIG. 5C2, except that a "most confident" transcription of "where is kona" is rendered, along with a "next most confident" transcription of "where is kono". Further, in FIG. 5C3 instructions 564C31 and 564C32 are provided that instruct the user how to choose respective of the "where is kona" and "where is kono" transcriptions—or to "cancel". If one of the transcriptions is navigated to (e.g., using navigation arrows of navigation button 510), then navigation button 510 selected (e.g., a center press), the assistant client application can interface with the "MESSAGES" application (e.g., as described with respect to FIG. 5C1) to cause the corresponding transcription to be incorporated in the text entry field 560.

Figure 6A:
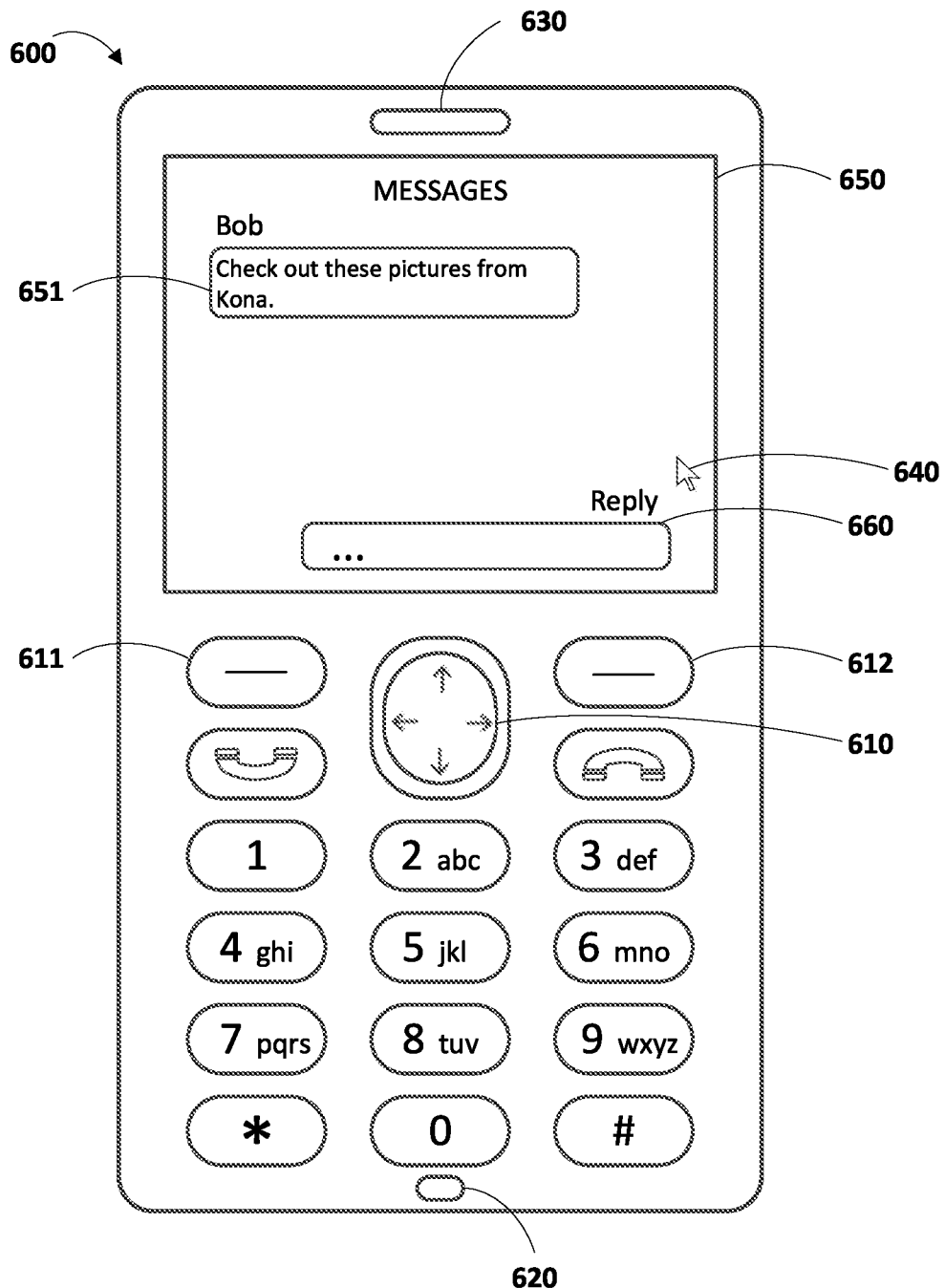
Figure 6B:
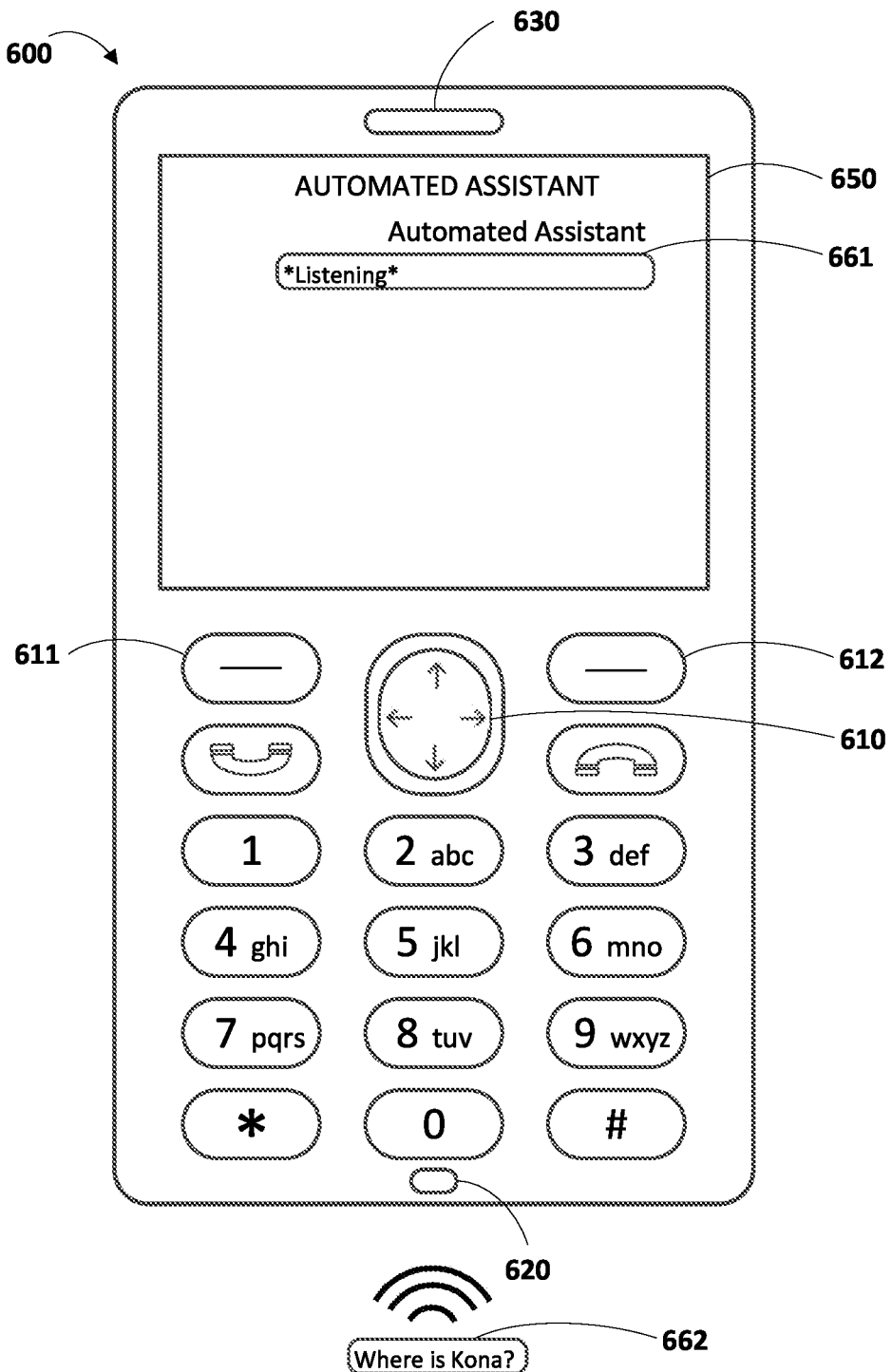
Figure 6C:
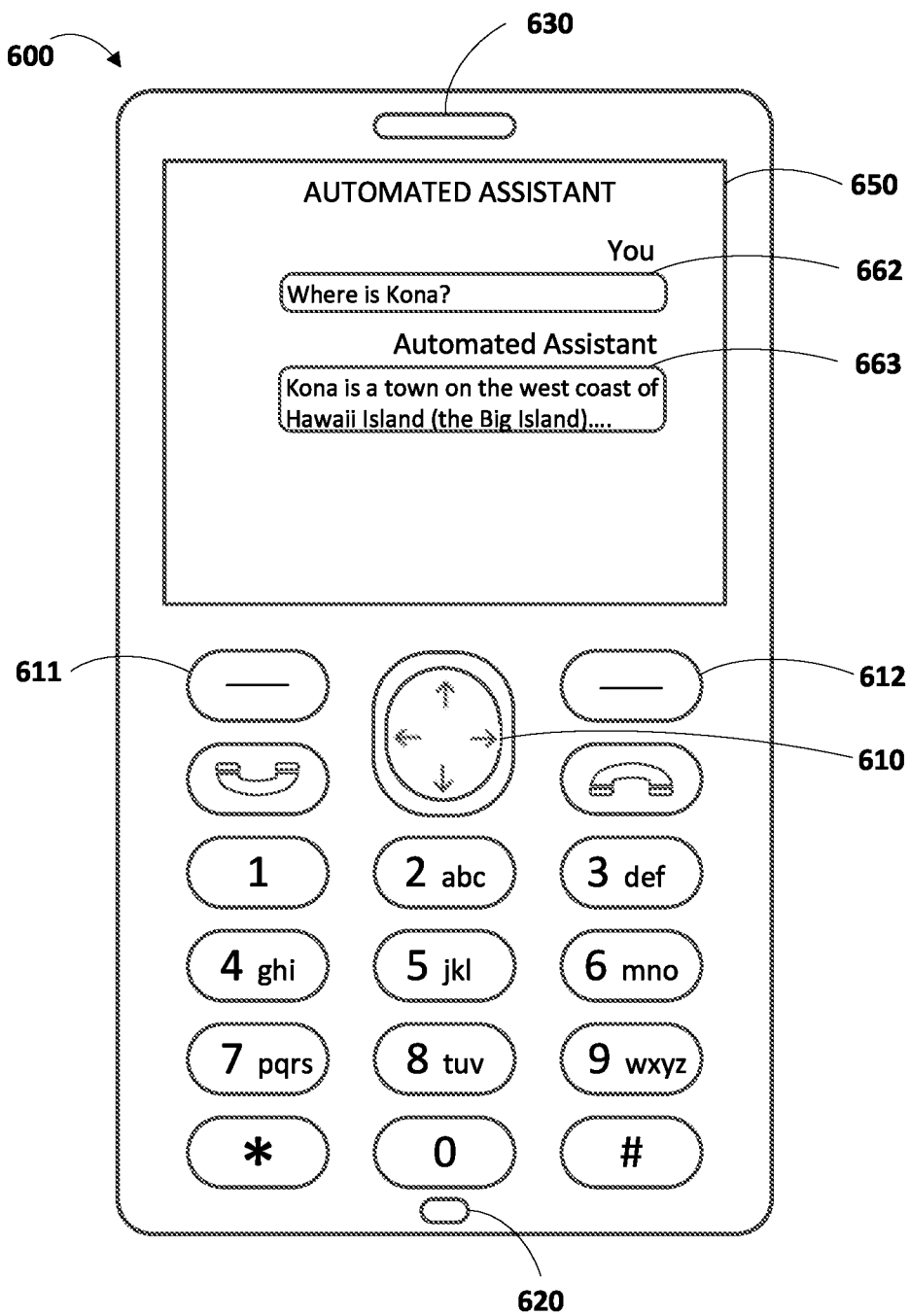

FIGS. 6A, 6B, and 6C illustrate an example of a user interacting with an assistant client application of a feature phone to obtain responsive assistant content in response to spoken input.

FIG. 6A includes a feature phone 600 having a home button 610, a first selectable button 611, a second selectable button 612, a microphone 620, a speaker 630, a cursor 640, a feature phone display 650, and no active text entry fields. The text entry field 660 is considered inactive as the cursor 640 is positioned outside the text entry field 660. The feature phone display 650 illustrates a "MESSAGES" application where a user has received an initial message 651 from Bob. The initial message 651 from Bob states "Check out these pictures from Kona." Thus, FIG. 6A is the same as FIG. 5A, but the text entry field 660 is not active.

FIG. 6B includes the feature phone 600 after an assistant client application has been invoked when the "MESSAGES" application was in the state depicted in FIG. 6A. For example, the assistant client application can be invoked in response to a user long-pressing the center of the navigation button 610 or another button (e.g., 611 or 612). The feature phone display 650 illustrates the "AUTOMATED ASSISTANT" application. In response to initiating the automated assistant application being invoked, the automated assistant application may provide an indication 661 of "Listening*" to indicate that the automated assistant application is ready to receive spoken input from the user. In response to the indication 661, a user may provide spoken input 662 that is detected by a microphone 620 of the feature phone 600 and provided as voice data to the assistant client application. In this example, the spoken input 662 is "Where is Kona?".

At least based in part on the text entry field (640 of FIG. 6A) of the "MESSAGES" application being inactive when the assistant client application is invoked, the spoken input 662 can be determined, by the assistant application (and/or remote automated assistant component(s)), to be a request for assistant content that is responsive to the spoken input (as opposed to a request for transcription of the spoken input). FIG. 6C illustrates an example of such assistant content, and how it can be rendered to the user via the assistant application. Accordingly, although spoken input of "where is kona" is provided in both FIG. 58 and FIG. 68, the assistant application (and/or associated assistant server) can respond in different ways in dependence on the state of the text entry field of the "MESSAGES" application when the assistant application is invoked.

In FIG. 6C, the feature phone display 650 illustrates the "AUTOMATED ASSISTANT" application and the responsive assistant content 663 of "Kona is a town on the west coast of Hawaii island . . . ", which is rendered in the assistant application, and can additionally and/or alternatively be audibly rendered (e.g., a ITS conversion thereof can be rendered).

Figure 7:
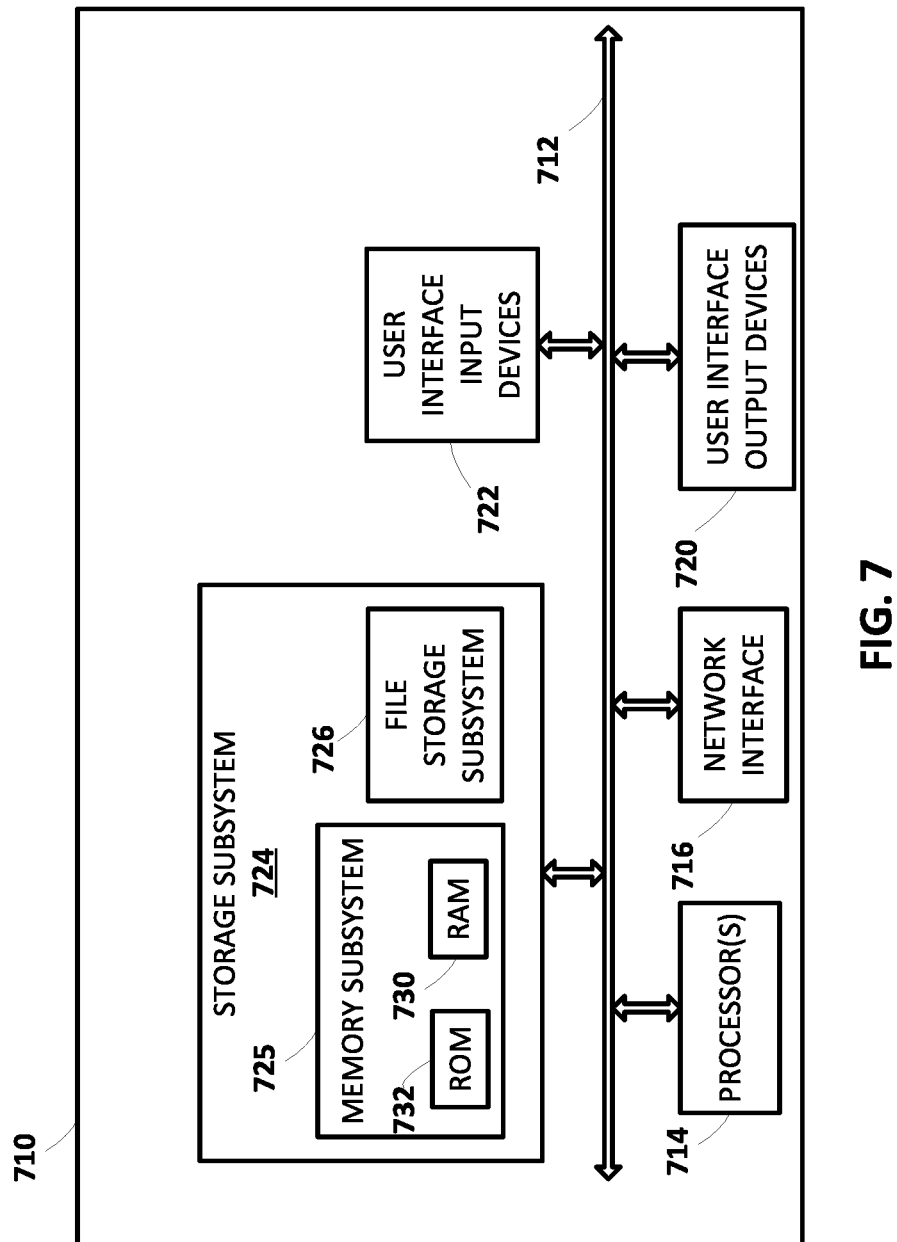
FIG. 7 illustrates an example architecture of a computing device.

FIG. 7 illustrates an example architecture of a computing device 710. The computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface input devices 722, user interface output devices 720, and a network interface subsystem 716. The input and output devices allow user interaction with the computing device 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computer system.

Storage subsystem 724 stores programming and data constructs that provide the functionality of some or all of the modules described herein. For example, the storage subsystem 724 may include the logic to perform one or more of the methods described herein.

These software modules are generally executed by processor 714 alone or in combination with other processors. Memory 725 used in the storage subsystem can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by the file storage subsystem 726 in the storage subsystem 724, or in other machines accessible by the processor(s) 714.

Bus subsystem 712 provides a mechanism for letting the various components and subsystems of the computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted is intended only as a specific example for purposes of illustrating some implementations. Many other configurations of computing device 710 are possible having more or fewer components than the computing device 710.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etch users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

What is claimed is:

1. A client device comprising:
   memory storing instructions;
   one or more processors operable to execute the instructions to:
   while a client application is executing in the foreground of an operating system of the client device, interface with a remote configuration server to fetch experiment parameters for the client application, wherein the fetched experiment parameters comprise:
   one or more client flag values that, when committed, alter one or more aspects of the client application, and
   one or more server tokens that, when committed, are incorporated in requests, by the client application to a remote server, to cause the remote server to generate responses that are tailored to the one or more server tokens;
   write the fetched experiment parameters to local storage of the client device, wherein writing the fetched experiment parameters to the local storage queues the fetched experiment parameters for implementing as committed parameters in response to occurrence of a committing condition of the client application, without immediately implementing the fetched experiment parameters as the committed parameters;
   detect an occurrence of the committing condition;
   in response to detecting the occurrence of the committing condition:
   commit the fetched experiment parameters as committed parameters of the client application;
   subsequent to committing the fetched experiment parameters as committed parameters and when the client application is closed:
   receive a request to open the client application;
   in response to receiving the request, opening the client application, opening the client application including reading the one or more client flag values and the one or more server tokens of the committed parameters to in-memory cache for the client application, wherein reading the one or more client flag values to the in-memory cache causes the one or more aspects of the client application to be altered, and wherein reading the one or more server tokens to the in-memory cache causes the one or more server tokens to be included in a request, by the client application, to the remote server.

2. The client device of claim 1, wherein the committing condition is a close condition, wherein the close condition is responsive to a user request, or an operating system request, to close the client application.

3. The client device of claim 2, wherein in committing the fetched experiment parameters as the committed parameters one or more of the processors are to block the client application, after receiving the user request or the operating system request but before closing of the client application, until the fetched experiment parameters are committed as the committed parameters.

4. The client device of claim 3, wherein one or more of the processors are further operable to execute the instructions to:
   detect that the fetched experiment parameters are committed as the committed parameters; and close the client application responsive to the close condition, and after detecting that the fetched experiment parameters are committed, wherein in closing the client application one or more of the processors are to de-allocate all memory allocated to the client application by the operating system.

5. The client device of claim of 1, wherein the committing condition is an open condition, the open condition being responsive to a prior request to open the client application, the prior request preceding the request to open the client application, and following writing the fetched experiment parameters to the local storage.

6. The client device of claim 1, wherein interfacing with the remote configuration server to fetch the experiment parameters for the client application is responsive to determining that at least a threshold amount of time has passed since the client application of the client device last interfaced with the remote configuration server to fetch the experiment parameters.

7. The client device of claim 1, wherein one or more of the processors are further operable to execute the instructions to:
receive, after opening the client application, voice data detected via at least one microphone of the client device;
transmit, to the remote server, a request that includes the voice data and the one or more server tokens of the committed parameters; and
receive, from the remote server, content to be rendered in response to the request, wherein the content is different for different ones of the one or more server tokens of the committed parameters.

8. The client device of claim 7, wherein one or more of the processors are further operable to execute the instructions to render the content based on at least one of the client flag values of the committed parameters.

9. The client device of claim 8, wherein the content includes text and wherein in rendering the content based on at least one of the client flag values of the committed parameters one or more of the processors are to:
render the text in a color dictated by the at least one of the client flag values,
render the text in a font dictated by the at least one of the client flag values, or
render the text with a size dictated by the at least one of the client flag values.

10. The client device of claim 7, wherein the one or more server tokens influence whether the content is:
a transcription of the voice data to be incorporated in a text box that was active when the voice data was detected, or
a response that is responsive to the transcription of the voice data, but that lacks the transcription of the voice data.

11. The client device of claim 7, wherein the one or more server tokens influence whether the content includes:
a single best transcription of the voice data, or
the single best transcription of the voice data, and one or more additional candidate transcriptions of the voice data.

12. The client device of claim 7, wherein the content includes at least a first transcription of the voice data and a second transcription of the voice data, and wherein at least one of the local flags dictates whether the first transcription and the second transcription are displayed simultaneously, or are displayed sequentially.

13. The client device of claim 7, wherein the content is an assistant response that is provided as a progressive web app.

14. The client device of claim 7, wherein the remote server is to:
receive the request that includes the voice data and the one or more server tokens of the committed parameters;
select, based on the one or more server tokens included in the request, one or more experiments to trigger on the remote server, the selected one or more experiments being a subset of available experiments to trigger on the remote server; and
generate the content based on the selected one or more experiments.

15. The client device of claim 1, wherein the one or more local flags include at least one local flag that alters when a next interfacing with the remote configuration server will occur to check for new experiment parameters for the client application.

16. The client device of claim 1, wherein the one or more local flags include at least one local flag that alters when one or more contacts, stored locally on the client device, will be transmitted to the remote server for use by the remote server in biasing certain speech-to-text processing toward the one or more contacts.

17. A client device comprising:
memory storing instructions;
one or more processors operable to execute the instructions to:
receive a request to open a client application of the client device;
in response to receiving the request, open the client application, wherein in opening the client application one or more of the processors are to read currently committed parameters to in-memory cache for the client application, wherein the one or more currently committed parameters include:
client flag values that cause one or more aspects of the client application to be altered, and
one or more server tokens that are included in requests, by the client application, to a remote server, and that cause the remote server to generate responses to the requests that are based on the one or more server tokens;
determine, when the client application is executing in the foreground of the operating system responsive to the opening, to interface with a remote configuration server to fetch experiment parameters for the client application;
interface with the remote configuration server to fetch updated experiment parameters for the client application, the updated experiment parameters including one or more updated server tokens to replace the one or more server tokens and that are configured to cause the remote server to generate responses that are based on the one or more updated server tokens;
write the fetched updated experiment parameters to local storage of the client device, wherein writing the updated fetched experiment parameters to the local storage queues the updated fetched updated experiment parameters for committing in replacement of the currently committed parameters in response to occurrence of a committing condition of the client application, without immediately committing the updated fetched experiment parameters in replacement of the currently committed parameters;

detect an occurrence of the committing condition;
in response to detecting the occurrence of the committing condition:
commit the fetched updated experiment parameters, including replacing one or more of the currently committed parameters with the fetched updated experiment parameters.

18. The client device of claim 17, wherein the committing condition is a close condition, wherein the close condition is responsive to a user request, or an operating system request, to close the client application.

19. The client device of claim 18, wherein one or more of the processors are further operable to execute the instructions to:
receive a new request to open the client application, the new request being the first request to open the client application that follows committing the fetched updated experiment parameters;
in response to receiving the new request, open the client application, wherein in opening the client application one or more of the processors are to read the one or more fetched updated experiment parameters to in-memory cache for the client application.

20. A client device comprising:
memory storing instructions;
one or more processors operable to execute the instructions to:
receive a request to open the client application;
in response to receiving the request, open the client application, wherein in opening the client application one or more of the processors are to read currently committed parameters to in-memory cache for the client application;
determine, when the client application is executing in the foreground of the operating system responsive to the opening, to interface with a remote configuration server to fetch experiment parameters for the client application;
interface with the remote configuration server to fetch updated experiment parameters for the client application;
withhold committing of the updated experiment parameters as replacements for the currently committed parameters until occurrence of a committing condition of the client application is detected;
detect an occurrence of the committing condition;
in response to detecting the occurrence of the committing condition:
commit the fetched updated experiment parameters, including replacing one or more of the currently committed parameters with the fetched updated experiment parameters.

* * * * *